US006825810B2

(12) United States Patent
Ragner et al.

(10) Patent No.: US 6,825,810 B2
(45) Date of Patent: Nov. 30, 2004

(54) AUDIO EXTENSION FOR WIRELESS COMMUNICATION DEVICES

(76) Inventors: Gary Dean Ragner, 711 SW. 75th St., Apt. 103, Gainesville, FL (US) 32607; Jerry Allen Grant, 5 E. Wisteria, P.O. Box 662, Hemingway, SC (US) 29554; Robert Timothy Shevlin, 22 Masters Dr. South, Homosassa, FL (US) 34446

( * ) Notice: Subject to any disclaimer, the term of this patent is extended or adjusted under 35 U.S.C. 154(b) by 4 days.

(21) Appl. No.: 10/317,364

(22) Filed: Dec. 12, 2002

(65) Prior Publication Data

US 2003/0132884 A1 Jul. 17, 2003

Related U.S. Application Data

(60) Provisional application No. 60/340,919, filed on Dec. 12, 2001, and provisional application No. 60/399,292, filed on Jul. 29, 2002.

(51) Int. Cl.[7] .............................................. H01Q 1/38
(52) U.S. Cl. ............................. 343/700 MS; 455/93.1
(58) Field of Search .......................... 343/702; 455/11.1, 455/90.3, 128, 569.1, 575, 569

(56) References Cited

U.S. PATENT DOCUMENTS

| | | | |
|---|---|---|---|
| 4,571,595 A | 2/1986 | Phillips | |
| 5,014,346 A | 5/1991 | Phillips | |
| 5,170,173 A | 12/1992 | Krenz | |
| 5,337,061 A | 8/1994 | Pye | |
| 5,508,709 A | 4/1996 | Krenz | |
| 5,561,436 A | 10/1996 | Phillips | |
| 5,561,437 A | 10/1996 | Phillips | |
| 5,943,627 A | * 8/1999 | Kim et al. | 455/569.1 |
| 6,101,402 A | * 8/2000 | Bartha et al. | 455/569.1 |
| 6,104,350 A | 8/2000 | Ng | |
| 6,184,835 B1 | 2/2001 | Chen | |
| 6,215,447 B1 | 4/2001 | Johnson | |
| 6,246,374 B1 | 6/2001 | Perrotta | |
| 6,269,259 B1 | * 7/2001 | Lai | 455/569.1 |
| 6,377,827 B1 | * 4/2002 | Rydbeck | 455/575.3 |
| 6,397,087 B1 | * 5/2002 | Kim et al. | 455/569.1 |
| 6,510,311 B1 | * 1/2003 | Stitt | 455/90.3 |
| 6,519,475 B1 | * 2/2003 | Kim | 455/557 |
| 6,631,279 B2 | * 10/2003 | Rivera | 379/430 |
| 2001/0027089 A1 | * 10/2001 | Salam | 455/90 |
| 2002/0055374 A1 | 5/2002 | Rivera | |

FOREIGN PATENT DOCUMENTS

WO WO-0193611 12/2001

* cited by examiner

*Primary Examiner*—Tan Ho

(57) ABSTRACT

This invention provides a novel repositioning of the audio output on a personal wireless communication device (30) to greatly reduce the radiation impinging on a user's head and brain. Inverting cover (240) reduces radiation levels experienced by a user's brain by moving the audio output from the location of speaker (39) to earpiece (236). Sound from speaker (39) is routed through connecting air channels (243), (246), (238), and finally to earpiece (236) for listening. Repositioning of the audio output may also be done actively, by using electronically driving a speaker in earpiece (236). Keypad (36), display (34), and microphone (38) are positioned above audio output earpiece (236) so that when the assembly (communication device (30) and inverting cover (240)) is inverted, the user can talk normally, with earpiece (236) placed in the user's ear and microphone (38) located near the user's mouth. By locating the earpiece several inches away from transmitting antenna (32) the user's head receives much less electromagnetic radiation than prior art wireless communication devices.

28 Claims, 9 Drawing Sheets

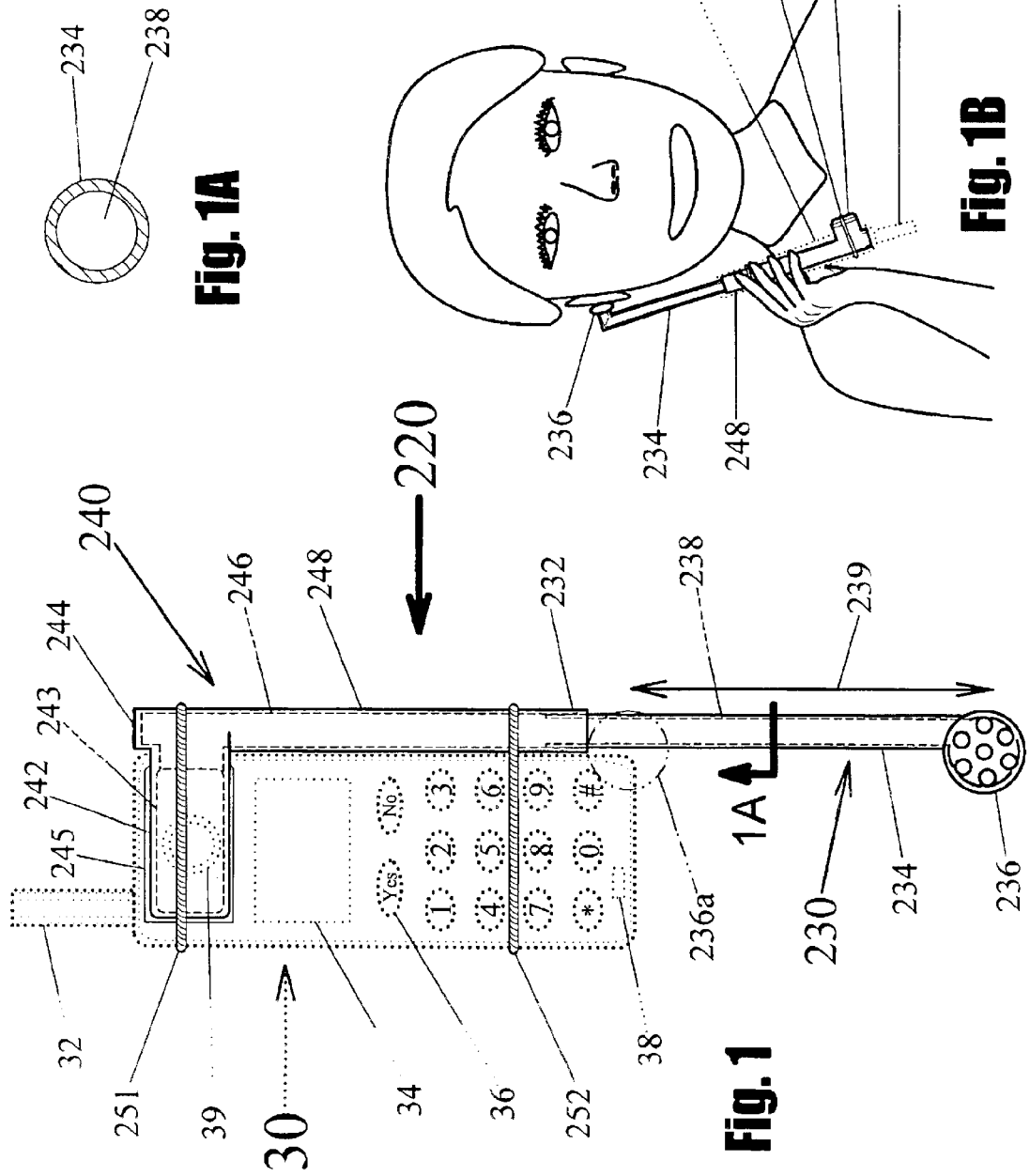

Figures 8, 8A:
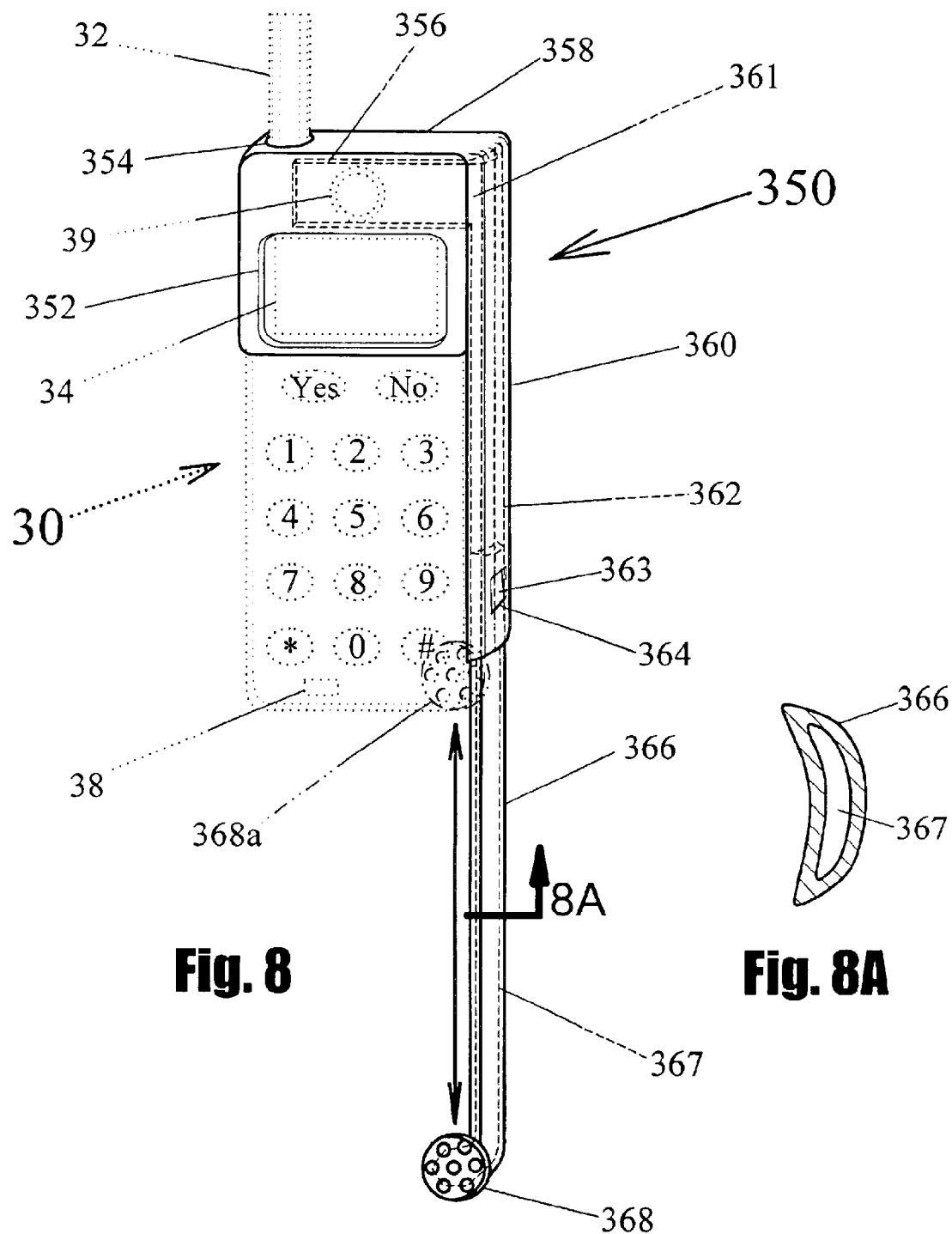

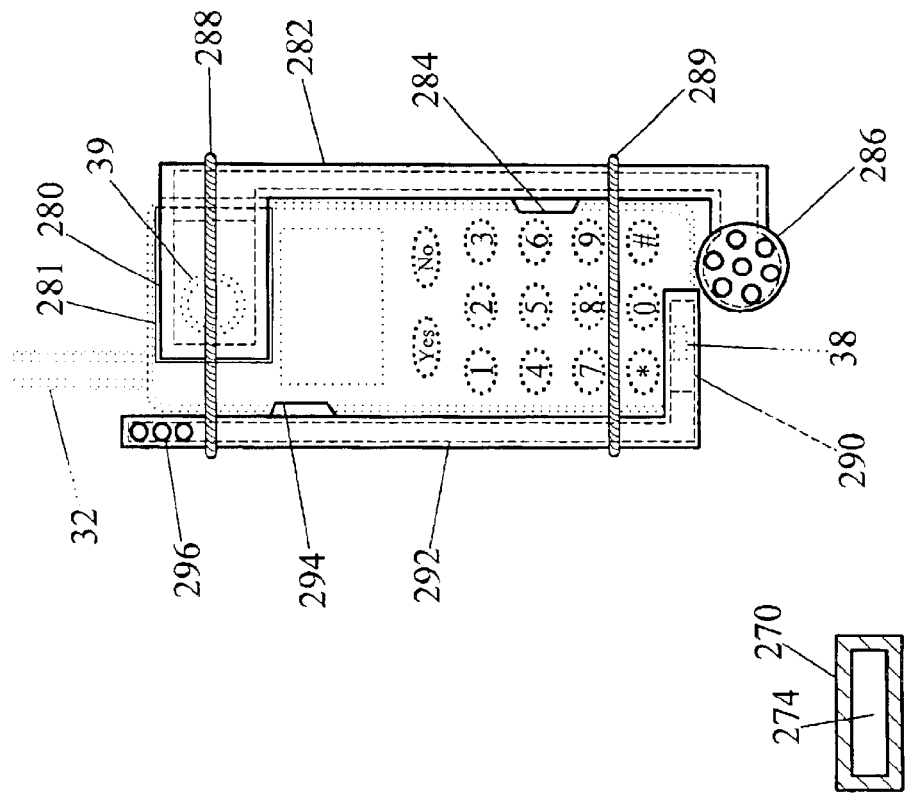
Fig. 3
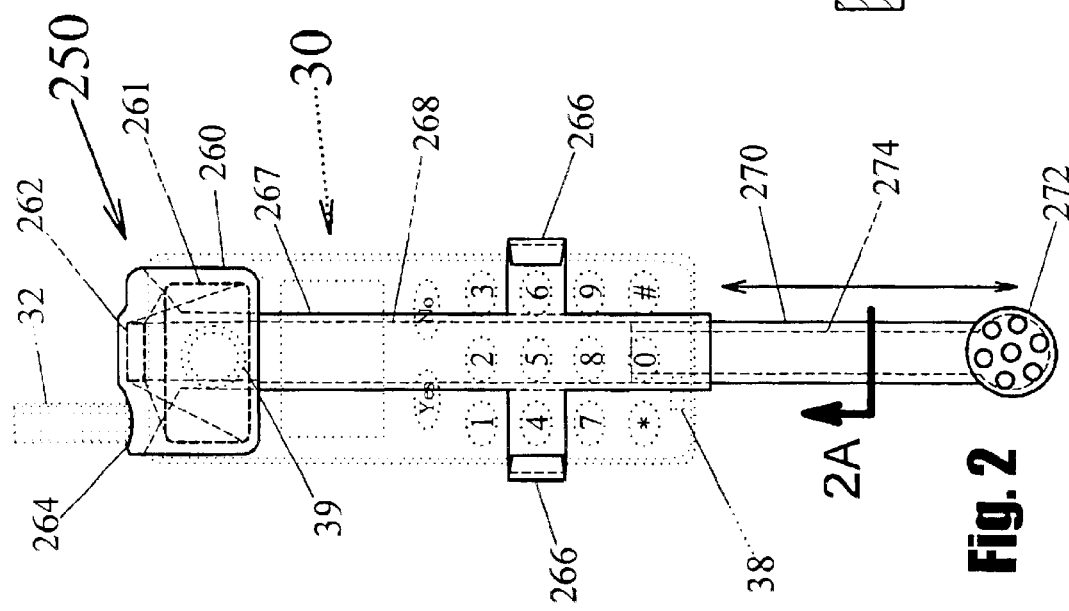
Fig. 2A
Fig. 2

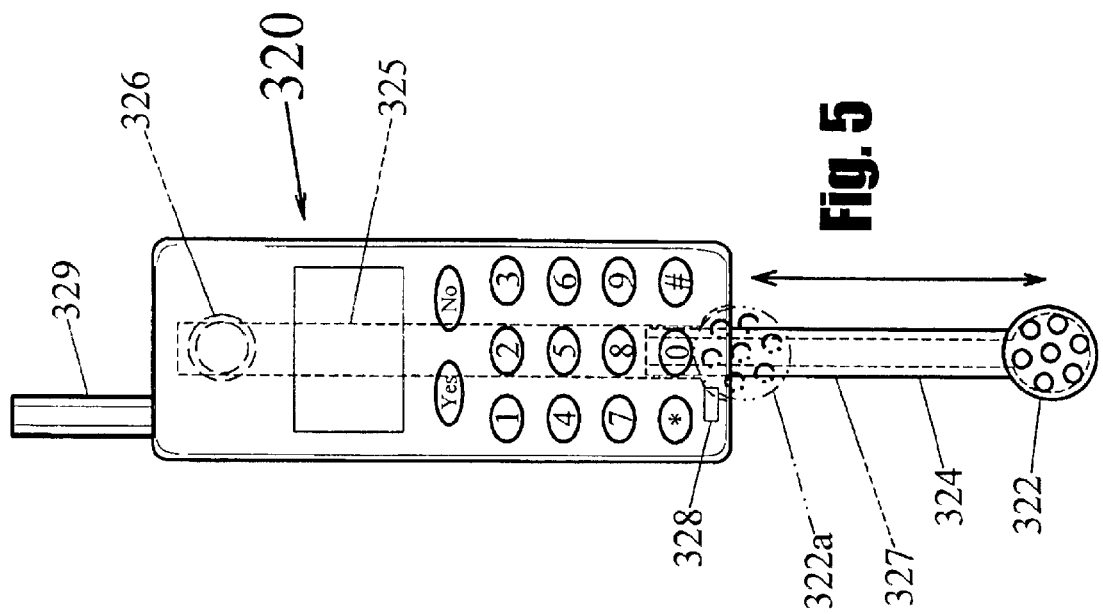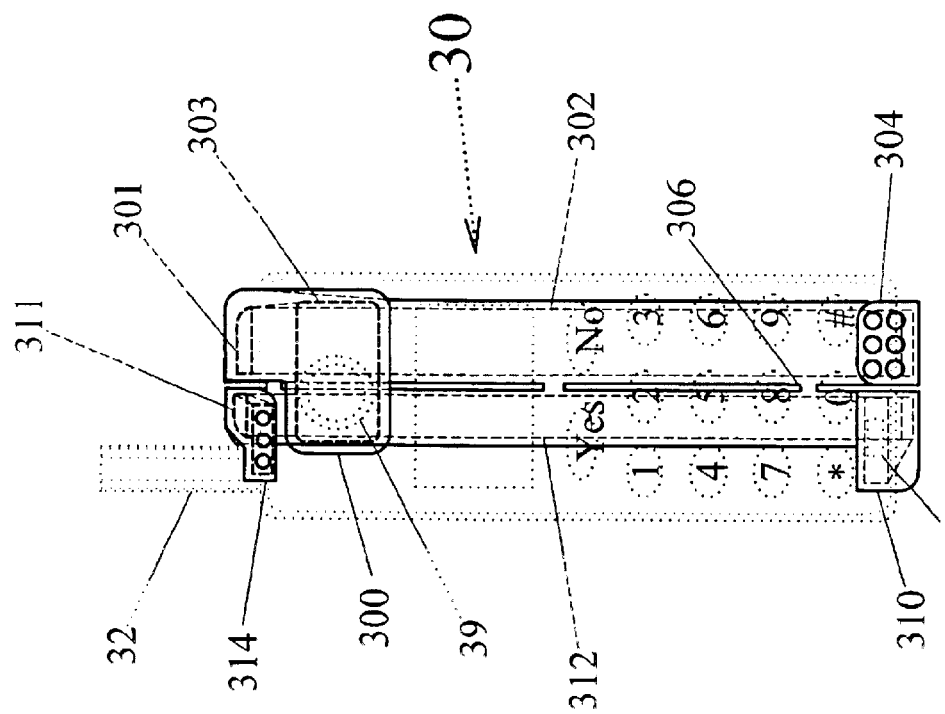

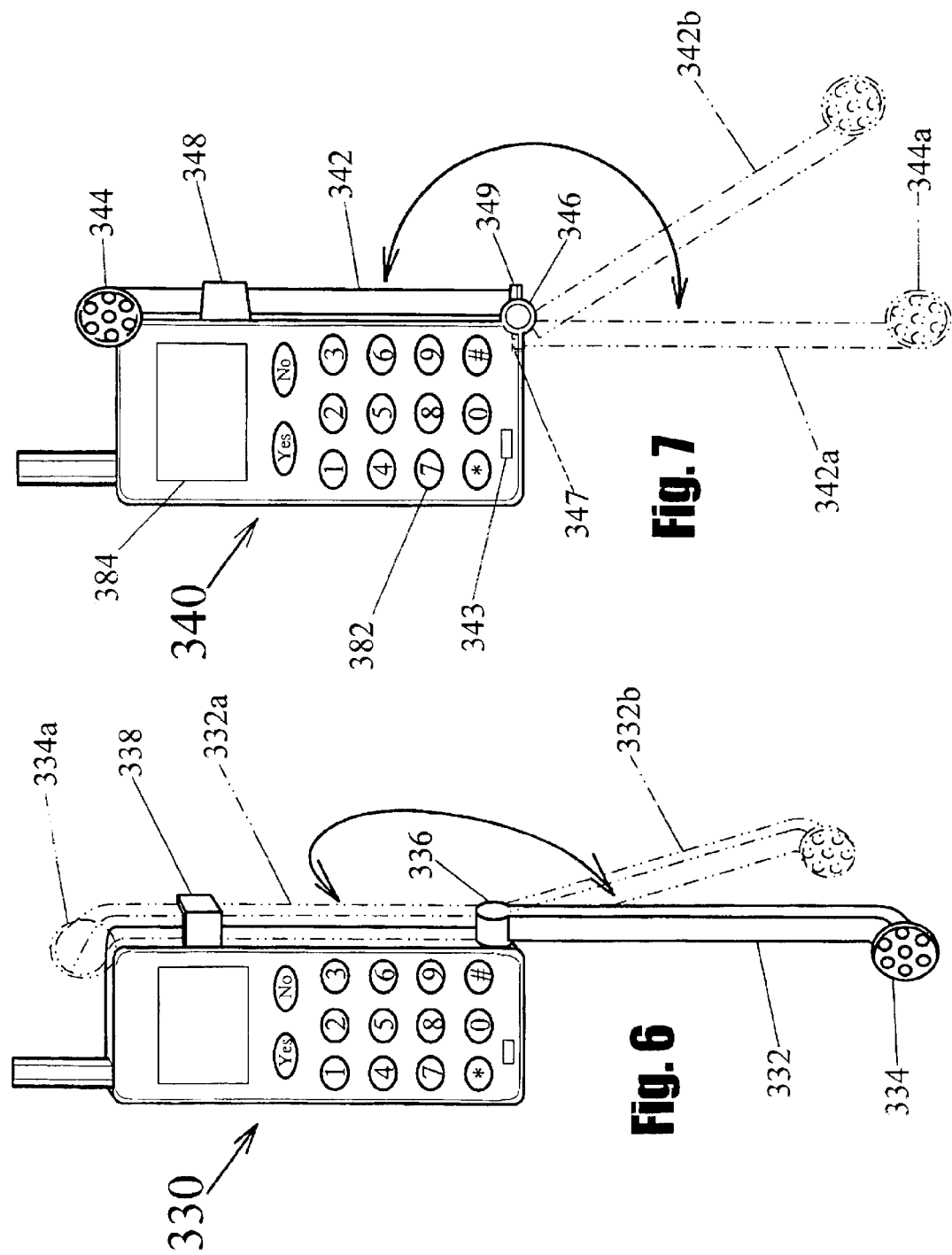

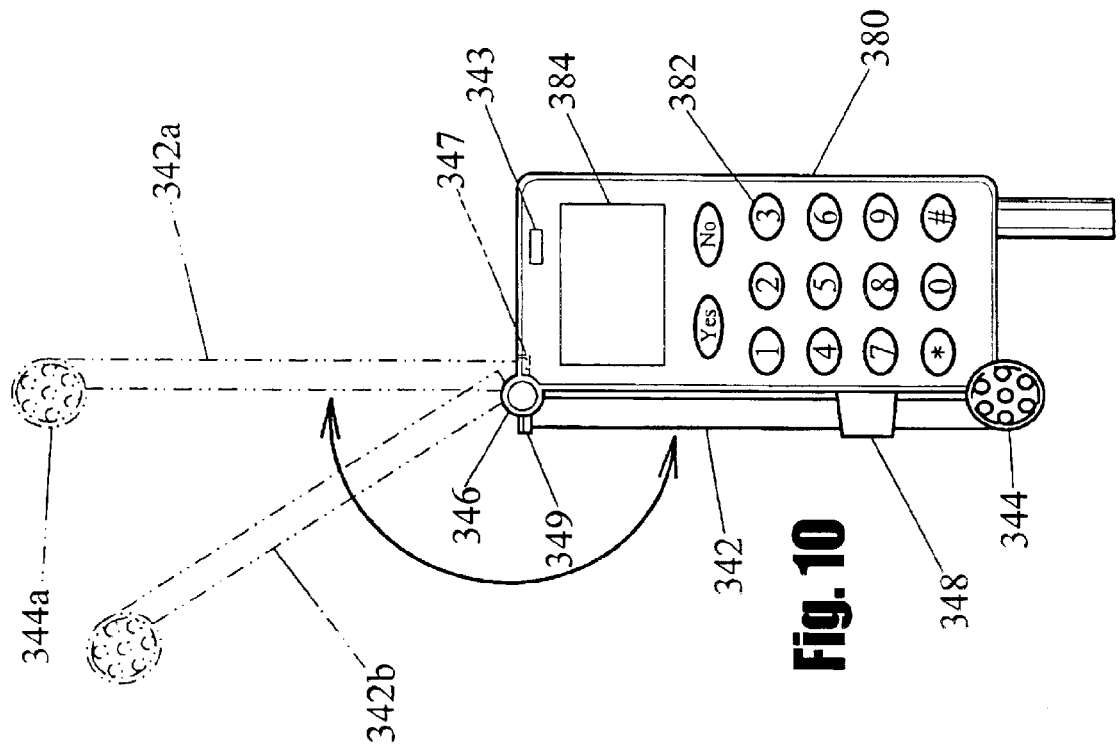
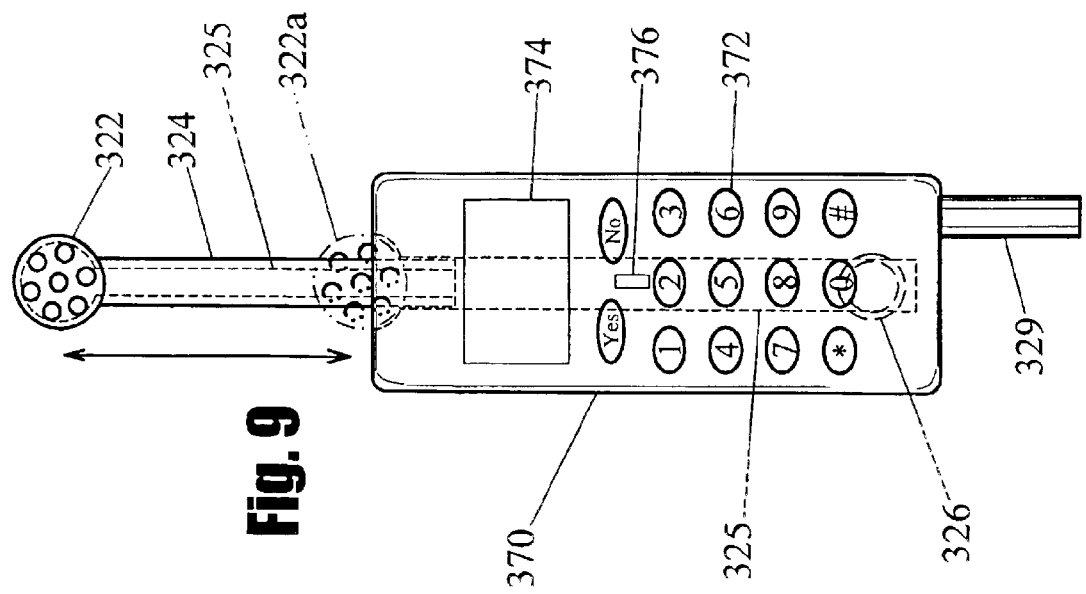

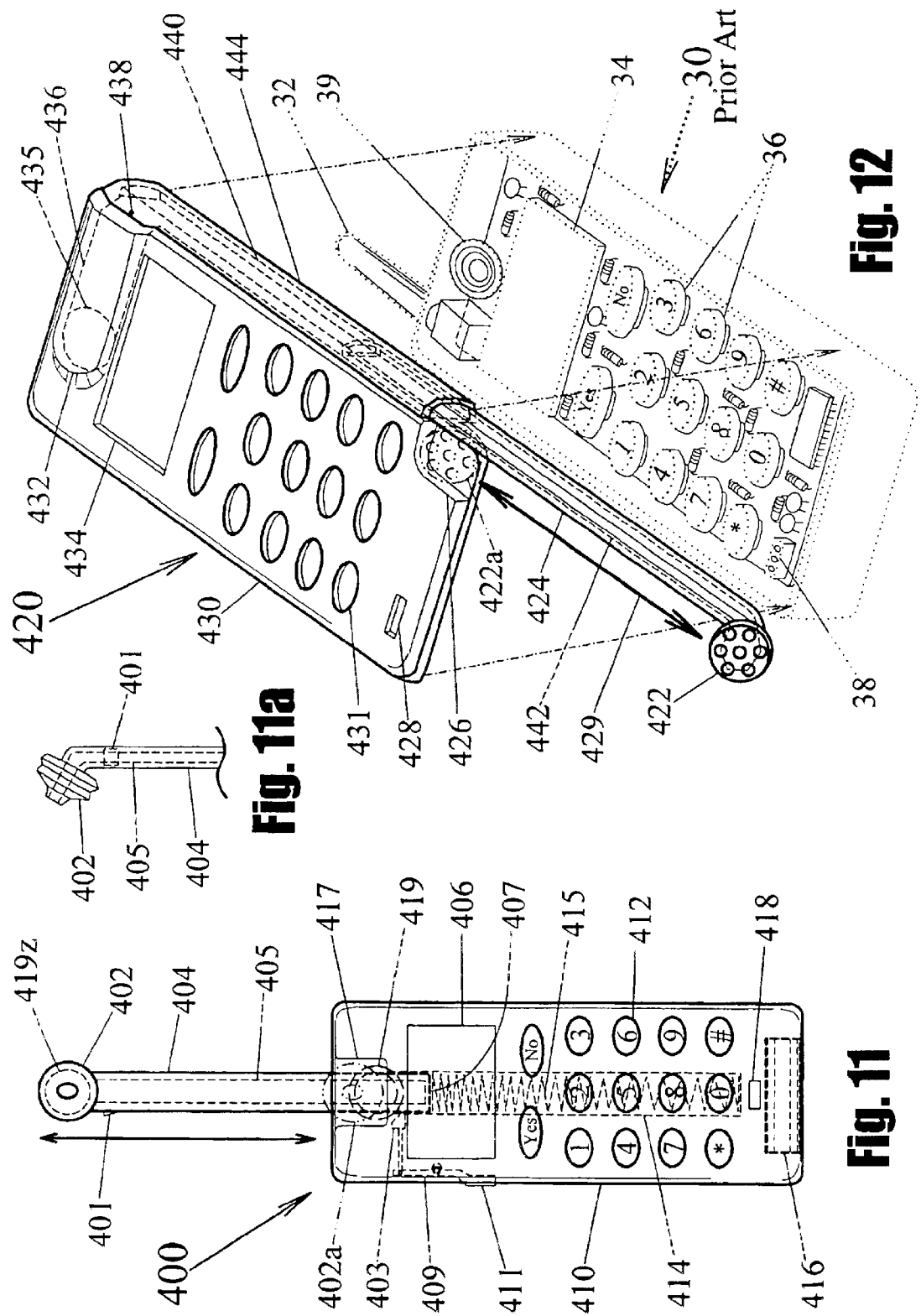

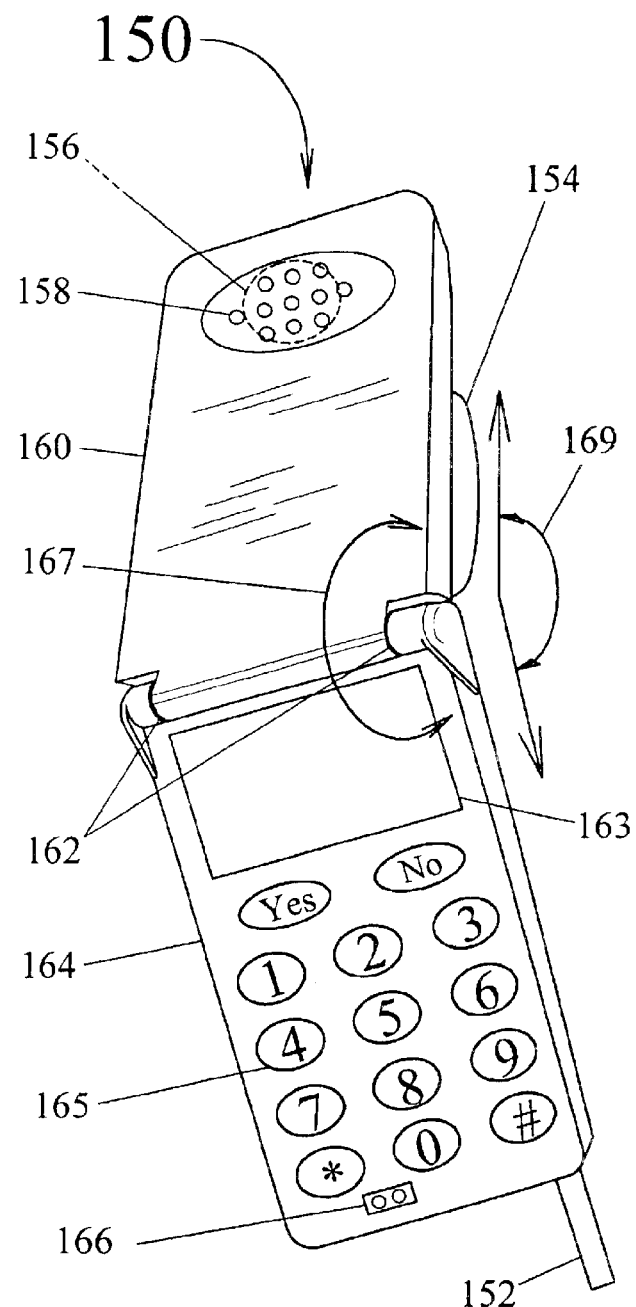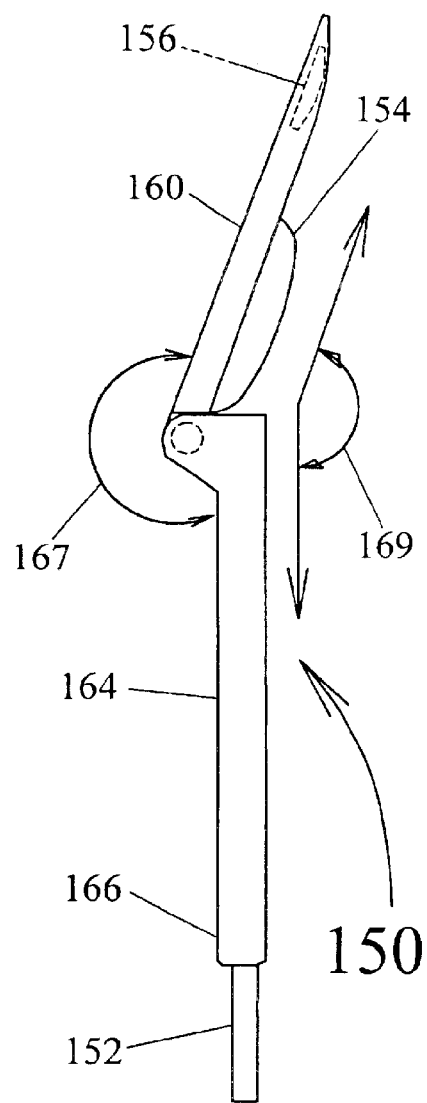
FIG. 14A  FIG. 14B

AUDIO EXTENSION FOR WIRELESS COMMUNICATION DEVICES

CROSS-REFERENCE TO RELATED APPLICATIONS

This utility application claims priority from: 1) U.S. Provisional application Ser. No. 60/340,919, filed on Dec. 12, 2001; and 2) U.S. Provisional application Ser. No. 60/399,292, filed on Jul. 29, 2002.

BACKGROUND

This invention pertains to personal wireless communication devices, and more specifically to communication devices that reduce the electromagnetic radiation intensity received by a user's brain and tissue.

BACKGROUND—DESCRIPTION OF PRIOR ART

The use of cellular phones and other wireless communication devices have become very popular in recent years. (PDA's phones, cellular phone, walkie-talkies, digital communicators, wireless phones, and others are among the many ways we communicate. Along with these phones has come the fear that they may cause health problems, including cancer. Whether this fear is well founded or just hysteria, science has yet to determine conclusively. However, the fact remains that the majority of people presently want devices that limit their exposure to electromagnetic radiation emitted by these communication devices. And the Environmental Protection Agency has taken the threat seriously enough to fund expensive long-term research in this area and has issued cautionary warnings about the extended use of cellular phones. The problem is particularly great with modern cellular phones and other high power wireless communication devices, which use the new very-short antennas. These short antennas produce a much higher power density around the antenna compared to older long antennas. When in use, these personal communication devices are brought to rest against the user's ear and the antenna is positioned approximately one inch away from the user's head with their brain absorbing a considerable portion of the antenna radiation. People's biggest fear is that this very close proximity to a high-power antenna may cause brain cancer and/or leukemia. Besides the possible problem with cancer, placing a person's head so close to the antenna also causes a significant portion of the transmitted energy to be absorbed or blocked. This reduces the transmitted signal and may cause communication problems due to a weakened signal.

Inventors have attempted to solve the radiation absorption problem by designing a multitude of ways to block and shield the transmitted signal from the user's head. Unfortunately, these designs still create very strong radiation patterns near the user's head, and also interfere with transmission and reception of signals. Many companies have compromised by simply moving the location of the antenna a few millimeters further away from the user's head. Angling the antenna slightly away from the user's head is also a common practice.

The Applicants' invention can reduce radiation intensities nearly an order of magnitude more-than any of the above prior art while still transmitting at the same level as the prior art. The Applicants' design may at the same time have better reception at the same power level than prior art because less signal energy is absorbed. The physical distance placed between the user and the transmitting antenna accomplishes this. Thus, combining a bottom mounted antenna with an extendible earphone arm can greatly reduces the radiation intensity absorbed by the user over the prior art. No prior art was found that showed the use of an ear-bud style audio earpiece which was mounted rigidly onto a cellular phone or other wireless communications device. No prior art was found that showed an extendible and retractable air channel for conducting sound to a user's ear. No prior art was found that showed a linearly extendible and retractable earphone.

SUMMARY

The reduction in radiation may be accomplished by moving the audio output earpiece away from the transmitting antenna and enabling the cellular phone to be used in an inverted orientation. This distancing of the earpiece from the transmitting antenna and inverting, or turning upside down of the cellular phone, allows the antenna to be moved a significant distance away from the user's brain, and placed far below the user's ear. The result can be that the user absorbs less total energy, and the highest intensity electromagnetic radiation ("hot spot") next to the brain can be eliminated. In one of the preferred designs, the speaker output can be extended below the bottom of the phone. The phone can then be inverted during use, with the microphone kept substantially in the same location with respect to the user's mouth as when it is used without the attachable cover. With the phone inverted in this way, the antenna can be moved several inches away from the user's head and face. This inversion of the cellular phone actually moves the entire phone way from the user's brain.

The disclosed phone attachment cover designs include phone faceplates, slip-on covers and other housing replacement designs. In this document, the disclosed phone attachments are referred to as inverting covers, attachment covers, and/or just phone covers. In all these designs, the speaker sound can be routed to a new audio output earpiece by either a passive sound conduit (passive) or with an electronic microphone and speaker combination (active). The passive design is preferred because it does not require any wire connections or batteries to be used. For a sound conduit (sound pipe, or sound channel), one end of a sealed pipe can be placed over the phone's speaker so that sound generated by the speaker is projected through the sound pipe to the earpiece end. This earpiece end can then be place near the user's ear so the user can hear the sound from the speaker. For the active design, sound output can be accessed, for example, either on the phone by its earphone output jack or with a microphone placed near the phone's speaker. This signal from the phone can then be directed through wires to a speaker in the earpiece of the phone cover. The use of the phone's own output jack can eliminate the need for an extra battery and the microphone.

A secondary advantage of moving the cellular phone away from the user's head is it allows better transmitting of electromagnetic signals. Absorption can be reduced because of the thinner effective cross-section of the user's chin and neck area compared to the user's head, and also because of the greater distance the antenna can be from the user's chin, neck, and body. Thus, the user absorbs significantly less total radiation in the horizon plane compared to when the antenna is placed up against the user's head, and this allows more signal to radiate outward toward a cellular tower for reception.

OBJECTIVES AND ADVANTAGES

Accordingly, several objects and advantages of our invention are:
a) To significantly reduce total radiation absorption by a user's brain and head when using a wireless communications device.
b) To improve hearing ability in noisy environments by using a small ear-bud style earpiece as the audio output.

This earpiece fits snugly within the "outer ear canal" of the user, thereby forming a sound barrier to outside noise and improving the user's ability to hear the audio output.

c) To allow a cellular phone antenna to be moved significantly away from the user's head and brain, thereby reducing the potential damage done by electromagnetic waves.

d) To provide antenna transmission at approximately chin or neck level, to improve horizontal transmission field due to the thinner cross-section of the user's chin area and neck (less absorption) compared to placing the antenna near the user's head.

e) To use lower transmitter power settings because of the better horizontal transmission field mentioned in item "d)" above.

f) To significantly reduce the electromagnetic energy intensity (power density) experienced by the user's brain.

g) To locate the normal operating position for a wireless communication transmitting antenna a significant distance away from the user's head without significantly changing the general ergonomics of the wireless device.

h) To allow the user to adjust the angle of the antenna for better reception while at the same time reducing the user's exposure to high-intensity antenna radiation.

i) To allow standard wireless communications devices to used the new invention without the need for significant modifications to the wireless device, such as by replacing the faceplate or slipping it into a phone cover.

j) To provide a bottom mounted antenna which can be pivotal along one or two axis.

k) To allow much higher transmitter power levels while maintaining safe radiation levels to the user's brain by operating the antenna a significant distance away from the user's head.

l) To reduce transmitter power by reducing absorption of the signal by the user's head and body.

m) To move the listening area (audio output) for a standard style phone significantly below the bottom of the phone (for inverted operation).

n) To provide a slip on attachment cover (shroud) for wireless phones, with a transmitting antenna on top, without the need for any modifications to the phone itself, which moves the sound output location below the bottom of the phone for inverted operation.

o) To provide a replacement face-plate for standard wireless phones with a transmitting antenna on top, thus moving the audio output location below the bottom of the phone.

p) To provide phone designs that can retract and extend the phone's earpiece for moving the phone's transmitting antenna away from the user's head.

q) To allow phone designs that are usable by the operator with the earpiece in both the retracted and the extended states.

r) To provide a phone design where presently manufactured electronic transceiver circuits may be used with inverted-antenna phone cover design that only require the redesign of the housing and speaker placement.

s) To provide a speaker output extension to a flip-phone design for moving the earpiece further away from the antenna.

t) To provide a flip-phone style phone where the earpiece moves away from the transmitting antenna for use by mounting the transmitting antenna on the bottom.

u) To provide a phone design with the speaker placed below the microphone, keypad, and display screen.

v) To provide a resilient arm for the speaker output, which may be extended significantly away from the transmitting antenna on a wireless phone.

w) To provide a phone with an extendible earpiece designed to remain semi-rigidly attached to the phone and small enough to fit within the outer ear canal of the user. In this way the user can avoid ear fatigue which is common when holding a flat earpiece phone against their ear for long periods of time.

x) To provide a phone design where a directional transmitting antenna is mounted on the bottom of the phone and an earpiece that is extendible above the top of the phone.

DRAWING FIGURES

FIG. 1 Cellular phone attachment cover with a retractable earpiece.

FIG. 1A Cross-section of sound pipe for cellular phone attachment cover in FIG. 1

FIG. 1B Cellular phone cover in FIG. 1 operated by a user.

FIG. 2 Alternate cellular phone attachment cover with retractable earpiece shown on a cellular phone.

FIG. 2A Cross-section of sound pipe for cellular phone cover in FIG. 2

FIG. 3 Alternative design for cellular phone cover—separate sound pipe for microphone and speaker.

FIG. 4 Alternative design for cellular phone cover—combined dual sound pipe, rear mounted.

FIG. 5 Cellular phone design—bottom mounted extendible earphone ear-bud.

FIG. 6 Cellular phone design—side mounted rearward pivotal earphone ear-bud.

FIG. 7 Cellular phone design—side mounted sideways pivotal earphone ear-bud.

FIG. 8 Alternative cellular phone cover designed with a slip on shroud.

FIG. 8A Cross-section of sound pipe for cellular phone cover in FIG. 8

FIG. 9 Cellular phone in FIG. 5 with display and keypad inverted.

FIG. 10 Cellular phone in FIG. 7 with display and keypad inverted.

FIG. 11 Cellular phone with antenna on bottom and extendible earpiece.

FIG. 11A Side view of extendible earpiece.

FIG. 12 Cellular phone faceplate with inverting audio output built in.

Figure 13:
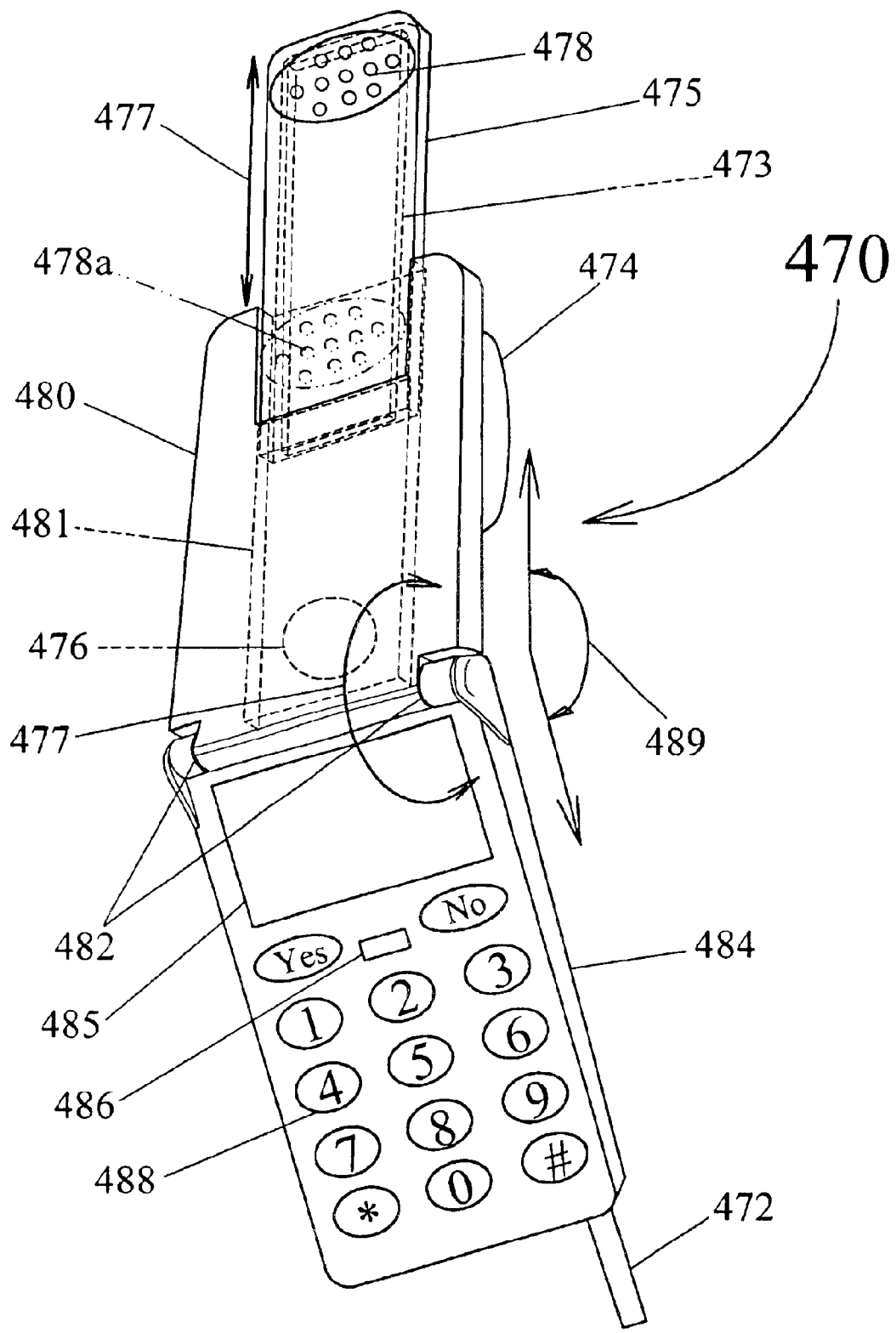

FIG. 13 Flip phone with inverted antenna and extendible audio output earpiece.

FIG. 14A Flip phone with inverted antenna (perspective view).

FIG. 14B Flip phone with inverted antenna (side view).

DETAILED DESCRIPTION

In FIG. 1 we see a phone assembly comprised of (prior art) cellular phone 30 (prior art personal wireless communications device) and preferred inverting attachment cover 220. Looking at the different components of a cellular phone we see an antenna 32 at the top, a speaker 39, display screen 34, keypad buttons 36, and microphone 38. This layout is standard for nearly all cellular phones, with antenna and speaker at the top, and the microphone near the bottom. This layout of speaker and microphone is also typical for other personal communications devices such as cordless phones because these communication devices tend to match the human face (ear and mouth). If we invert (turn upside-down) cellular phone 30, then speaker 39, and microphone 38 no longer match the positions of the user's ear and mouth respectfully. The inverting cover 220 moves the sound from speaker 39 to earpiece 236 to reestablish the proper positioning of speaker sound and the microphone. Because both speaker and microphone may operate simultaneously on cellular and cordless phones, the speaker and microphone can be physically separated to reduce feedback.

Placing earpiece 236 below the bottom portion of phone 30 allows this proper physical separation when the phone assembly (phone 30 and cover 220) is inverted and arm 234 is extended. In specific embodiments, arm 234, like other extendible arms in this document, can be resilient, but also rigid enough to hold in a user's ear. Arm 234 may also be flexible enough to cushion movement of the phone during use, but should be able to support its own weight without significant bending. This balance between flexibility and stiffness provides a comfortable listening device. Earpiece 236, may be an ear-bud style earpiece which can be formed of a soft material, and shaped and sized to fit snugly within a person's outer ear canal (outer portion of the external auditory meatus). Other styles of earpiece can also be incorporated with the subject invention. Other embodiments taught in this specification may also use this ear-bud style earpiece. The earpiece may also have a larger surface so that it fits against the outside of the user's ear. The snug fit of the ear-bud style earpiece 236, can substantially reduce external noise from getting pass the earpiece. This can allow the user to hear better in noisy environments and the small size of an ear-bud style earpiece 236 can make the phone assembly much more portable.

Cover 220 can be strapped onto cellular phone 30 with, for example, elastic bands 251 and 252. More bands may be used if necessary, but generally two bands (one at the top (251) and one at the bottom (252)) should be sufficient. The inverting cover 220 can comprise a slide extension 230 and a body 240. Extension 230 can comprise extension tube 234 and earpiece 236. Extension tube 234 can be hollow and can conduct sound through its interior passageway 238 from one end to the other. It may also be possible to design tube 234 to conduct sound through the material making up the tube and to the earpiece. This can eliminate the need for passageway 238. Earpiece 236 can be designed to direct sound within channel 238 and/or sound within tube 234 material itself to the user's ear for listening. The other extension tubes in this application may operate in the same way. Body 240 can comprise hollow speaker cover 242, gasket 245, extension 244, channel body 248 and extension stop 232. Channel body 248 can be designed to receive extension tube 234, and allow it to slide easily between an extended and retracted position. In a specific embodiment, extension tube 234 can be fixed in and extended position with respect to channel body 248 rather than sliding between and extended and retracted position. Similarly, the other designs may also use a fixed extension tube to extend the earpiece away from the body of the phone and its transmitting antenna.

Speaker cover 242 can be designed to seal over speaker 39, with seal gasket 245 forming a nearly air-tight seal. Gasket 245 may be made from, for example, any standard sound sealing materials, such as, foam rubber, urethane foams, rubber, and others. The more air tight the seal the more efficiently sound will be driven to earpiece 236. Speaker cover 242 can have an air cavity 243 which can be connected to passageway 246 in channel body 248, and can allow sound to be conducted without substantial loss between speaker 39 and earpiece 236. Slide extension 234 can be designed to click in place in both its extended and retracted positions, and thus, to hold the earpiece in place when in use and stored respectfully. Earpiece 236 is shown in its extended position in FIG. 1 with earpiece 236a showing its retracted (stowed) position. Stop 232 prevents extension 234 from slipping completely out of channel body 248. Stop 232 is not shown in detail here, but may consist of any number of stop mechanisms used in plastic molding, including the most common tab/notch configuration where a tab or ridge on one part catches on a notch or opposing ridge on the other part (see FIG. 8). FIG. 1a shows a cross-section of extension 234, with extension 234 having a circular cross-section with passageway 238 in the middle. Other cross-sectional shapes can also be utilized.

In FIG. 2 we see another inverting cover very similar to inverting attachment 220 in FIG. 1. Inverting attachment cover 250 is shown on cellular phone 30 (prior art). Phone 30 is also shown in FIG. 2 as a see-through part, so that the inverting cover 250 may be seen more clearly. The attachment 250 can include a body section and an extension section. The body section can comprise speaker cover 260 with an antenna hole 264, and a channel body 267 with holding clips 266. The extension section can include a sliding extension 270 with an earpiece 272 on the end. A substantially sealed air passageway exists from speaker cover 260 to earpiece 272. This sealed passageway can go from the speaker cavity 261, to channel 262, down channel 268, into channel 274, and finally to earpiece 272. Speaker cavity 261 can be sealed against the phone's housing around speaker 39 by pressing speaker cover 260 against the speaker area of phone 30. A gasket (foam rubber, etc.) around cavity opening 261 helps form a nearly air-tight seal between speaker cover 260 and phone 30. Sound from speaker 39 can thus be trapped by speaker cavity 261 which channels the sound through sound channel 262 at the top of the cover. The sound then continues down channel 268 within channel body 267, into passageway 274 within extension 270, and finally to earpiece 272 for listening. The sliding interface between channel 268 and extension 270 can be designed to remain substantially sealed so that sound can be trapped within the interior channels 268 and 274. The inverting cover in FIG. 2 can be designed to pressure fit onto phone 30. A dense foam rubber gasket can be molded around the opening in cavity 261 against phone 30, and on the surface of channel body 267 opposed to the speaker cover. Thus, when hole 264 is slid down over antenna 32, these foam rubber pads can be compressed against phone 30 on both the front and back to secure speaker cover 260 and channel body 267 against the phone. In addition channel body 267 has a pair of clips 266 which snap fit around the bottom portion of phone 30. The combination of the foam pads on speaker cover 260 and channel body 267, and clips 266, hold the inverting cover securely on phone 30. The springiness of the foam pads and clips 266 allow this inverted cover to adjust to slightly different models of cellular phones. However, the inverted cover in FIG. 2 is not nearly as universally mountable as the inverted cover design in FIG. 1. This is because the inverted cover in FIG. 2 has a limited range of cellular phone thicknesses that will snugly fit between the foam pads on speaker cover 260 and channel body 267. The top of the inverting cover (at area labeled 262) may have some elasticity to it to allow the speaker cover to adjust to a wider range of phones. The width of clips 266 also limit the universal use of this design, but the design can be easily customized for specific brands of cellular phones. FIG. 2A shows a cross-section view of extension 270 with passageway 274 inside it.

In FIG. 3 we see that more than one sound channel may be used. In this design two separate sound conducting channels are used, one for the speaker and another for the microphone. In this way, one may passively move the position of both the speaker output and the microphone input. Again the idea is to move the earpiece 286 away from antenna 32 to reduce radiation intensity to the user's brain. To do this, speaker cover 280 can be used to trap sound coming from speaker 39, and channel it through sound tube 282, and then to earpiece 286. In this way, sound can be conducted from speaker 39 to earpiece 286 for the user to hear. Speaker cover 280 can have a sticky (adhesive) foam rubber gasket 281 between it and the cellular phone to ensure a good seal around speaker 39. A clip (not shown) behind speaker cover 280 may be used to press against the back of the cellular phone and help hold cover 280 against the phone. Holding clip 284 can form a "U" shaped pocket for the side of the cellular phone to fit in. This helps stabilize the entire assembly. One or more of these holding clips may be used. For the microphone, sound pickup 296 collects sound from the user's voice and channels it through sound tube 292 to microphone cover 290, where microphone 38 receives it. Microphone cover 290 may wrap around the bottom of the cellular phone for phone designs where the microphone is placed on the bottom of the phone. The microphone cover can be sealed against the cellular phone body with a sticky foam rubber gasket (not shown), and also a clip (not shown) against the back of the phone which compresses microphone cover 290 against the phone. Holding clip 294 can be used to stabilize the microphone assembly. A pair of elastic bands 288 and 289 holds both sound conducting channels against the phone. Other methods may be used to hold the two pieces against the phone, such as adhesive, clips, or other methods. However, elastic bands seem to be one of the most forgiving way to position, and hold in place, sound covers 280 and 290.

In FIG. 4 we see an inverting cover design very similar to the design in FIG. 3 except the two sound channels have been combined with small connecting pieces of plastic 306 between them. The two halves can be separated in this way so speaker sound in channel 302 does not cross-talk into microphone channel 312. Channels 301 and 302 can be different sections of the same air channel, and channels 311 and 312 can be the same channel. The air gap between channels 311 and 301, and the air gap between channels 312 and 302, greatly reduce the sound that is able to conduct between them. On the speaker side (right side in FIG. 4), speaker cover 300 can be sealed around speaker 39. Cavity 303 leads to channel 301, which wraps around behind phone 30 to sound channel 302. Channel 302 can be designed to conduct sound to earpiece 304 by forming a sealed channel from channel 301 down the back of the phone around the bottom of phone 30, and then in front of the phone to earpiece 304 for the user to listen. On the microphone side (left side in FIG. 4), sound inlet 314 can be designed to pick-up the user's voice and conduct the sound into channel 311. Sound then travels from channel 311 to the back of the phone and into channel 312 which continues to the bottom of the phone and curves back around the bottom of the phone to microphone cover 310. Thus, in a specific embodiment, a continuous sealed channel can exist between sound inlet 314 and channel 312 for microphone 38. Once the sound has reached microphone cover 310, it can be detected by microphone 38. The entire cover assembly can be designed to slide onto phone 30 from the right side, with gasket material (foam rubber, rubber, polymer, or other soft sound sealing material) forming a tight seal around speaker 39 and microphone 38. The phone can also be gripped between opposing surfaces on the top, the bottom, or the top and bottom of phone 30. On the top, phone 30 can be gripped between covers 300 & 314, and channels 302 & 312 respectfully. On the bottom, the phone can be gripped by cover 304 & 310, and channels 302 & 312 respectfully.

In FIG. 8 we see another way to attach an inverting cover to a phone. The inverted cover designs (FIGS. 1 through 4) can be universal designs, that is, made to fit more than a single model of phone. Cover 350 can be custom built to fit one, or more prior art cellular phone. Because of this, cover 350 can be molded to snugly fit on phone 30 like a glove. The snug fit of shroud 358 can hold inverting cover 350 in place. Shroud cover 358 may be made out of a plastic material and designed to slide down over phone 30, with antenna 32 fitting through in hole 354, and window opening 352 aligning with display screen 34. Shroud 358 can be molded to exactly cup the top portion of phone 30. Alternatively, shroud 358 could be designed slightly smaller than the phone and made out of a rubbery material so that the shroud would be able to stretch and then snap tightly round the phone for a truly skin tight fit. This alternative would allow the rubbery shroud to possible fit on many other prior art phone designs. The rubbery shroud could also be made clear so no opening would be needed for the display screen. Another alternative would be to mold shroud 358 and sound conduit 360 as two pieces (front and back) which snap together over phone 30. Gasket material may be used inside the two halves to provide a tight resilient fit. With front and back pieces, phone 30 can be nearly any shape and still allow the two halves to snap together.

In FIG. 8, inverting cover 350 can be constructed of two basic parts: 1) a body, and 2) an extension arm. The body can have a shroud cover 358 with a sound conduit 360 attached to the side of it. Shroud 358 can have a window opening 352, a speaker air passageway 356, a hole 354, and an air passageway 361. Sound conduit 360 can have an air passageway 362 down its center and a slide stop mechanism comprised of stop tab 363 on arm 366 and stop hole 364 in sound conduit 360. The stop mechanism may be designed in many other standard ways. For this design, the stop mechanism can be simply a slot 364 in sound conduit 360 which catches a tab 363 on the outside of sliding arm 366 to stop the arm from sliding completely out of conduit 360. Tab 363 can also help to hold arm 366 in the extended position by requiring force to push it back out of notch 364. Channel 362 not only supports the sliding of arm 366, but also conducts sound down to extension arm 366. Speaker cavity 356 is connected to air channel 361 which is connected to channel 362. These three air passageways (channels) can be connected to provide a complete path for sound to travel from speaker 39 to the top end of slide arm 366. The extension arm can include slide arm 366, channel 367 down the center of arm 366, earpiece 368, and a tab 363 shown catching on stop 364. Arm 366 can be molded to follow the shape of phone 30 for an ergonomic tight fit. In FIG. 8A we see the cross section of arm 366 and how it can be curved to follow the rounded side-surface of the phone and provide a low profile. Air passageway 367 can be crescent shaped and large enough to efficiently conduct sound from sound conduit 360 to earpiece 368. Thus, an air channel exists all the way from speaker 39 to earpiece 368 for the user to listen. The interface between speaker passageway 356 and phone 30 can be sealed by the tight fit of the shroud 358 over the top of the phone, but may include a thin foam gasket round the interface for a better seal. A tight seal can also be formed between the walls of channel 362, and the outside of slide arm 366. The air passageway from speaker 39 to earpiece 368 is made as air tight as possible so that pressure waves coming from speaker 39 can travel efficiently to earpiece 368. Earpiece 368 is offset forward from sliding arm 366 so that when in its retracted position 368a, it comes to rest above the front surface of the keypad on phone 30. This helps protect the earpiece from accidentally being damaged and also reduces the total length of the phone when stowed.

FIG. 12 shows an inverting faceplate 420 for placement on prior art cellular phone 30. Phone 30 can be a typical present day design where the stock faceplate can be removable for replacement with other custom faceplates. Alternatively, the phone's entire outer case may be replaced, not just the faceplate, to give the phone a complete custom look. Many shapes and styles for the outer case of the phone are possible. Phone 30 is shown with its stock faceplate removed. Antenna 32, speaker 39, display 34, keypad 36, and microphone 38 all remain with the main body of the phone. Faceplate 420 can be designed so that it aligns with the components of phone 30, that is, speaker opening 435 matches with speaker 39, window 434 matches with display 34, key holes 431 match with keypad 36, and microphone port 428 match with microphone 38. Thus, faceplate 420 covers prior art phone 30 just like the original faceplate it replaces. Phone cover 420 can also have a built in audio extension designed to conduct sound from speaker 39 to earpiece 422. Opening 435 in housing 430 collects sound waves from the speaker and directs them through channel 436 within raised bump 432. Sound continues to side channel 438, through channel 440, channel 442 and finally to earpiece 422. Speaker opening 435 can be designed to seal nearly airtight around speaker 39, and the continuous channel from the speaker to the earpiece can also be substantially airtight to reduce, or prevent, sound leakage. Arm 424 is slidable within extension housing 440 and guided by channel 440. Channel 442 is designed to conduct sound from channel 440 to earpiece 422 for the user to listen. Arm 424 can be movable between an extended position shown with earpiece 422 away from housing 430 to a retracted position with earpiece 422 at position 422a through range of motion 429. Arm 424 can also be designed to click into place in both the extended and retracted positions for stable use and storage respectfully.

Audio Extention Built into Phone—FIGS. 5, 6, 7, 9, 10, 11, 13 and 14

The remaining figures show designs which have extending structures built directly into the phone. These phones can have the antenna mounted on the bottom of the phone for operation into the upright orientation (FIGS. 9, 10, 11, 13, and 14) or can have the antenna mounted on the top, but designed so the phone may be inverted for use (FIGS. 5, 6, and 7). Each design can allow the speaker (or earpiece) to be moved away from its normal listening position and also a significantly distance away from the transmitting antenna. For designs in FIGS. 5 through 7, where the phone body is inverted during use, a main design change compared to a typical cellular phone design (antenna on top) is to reposition the operating location of the audio output earpiece. This can significantly reduce the cost of development for a new phone design for both passive and active audio output designs. For passive sound channels, little or no change is needed in the actual electronic circuit with only housing design changes being made. If an active speaker design is used, changes may be needed to the phones circuit board layout if the existing speaker is mounted to the circuit board. The changes are minor since the existing speaker on a standard cellular phone circuit board can easily be moved by simply running speaker wires to a new position. Since only the speaker needs to be moved, this also amounts to little more than modification of the phone's housing. Wires can simply run from the normal position on the circuit board to the speaker's new location on the end of its extension arm. It should be noted that in all of the designs disclosed in this document, the transportation of sound to the earpiece may use a passive sound tube to conduct sound to the earpiece, or use active electrical wires connected to a speaker within or near the earpiece. Both will allow sound to be conducted to the user's ear.

In FIG. 5 we see a cellular phone design very similar in construction to the assembly in FIG. 2. In this design, however, the inverting cover can actually be built directly into the phone's housing. Phone 320 can be very similar in construction to a prior art cellular phone with antenna 329 on top and microphone 328 at the bottom. However, phone 320 has speaker 326 substantially enclosed within it, so sound projects directly into channel 325. Sound within channel 325 travels down into the air channel 327 within extension tube 324 (extension arm), and finally to output earpiece 322. Thus, the sound from speaker 326 can be channeled to earpiece 322 for the user to listen. Earpiece 322 can be extended and retracted because extension tube 324 can be slid in and out of sound channel 325. This allows the earpiece to be retracted to its stowed position 322a. A stop prevents tube 324 from falling completely out of channel 325. This design allows all the electronic components of a prior art cellular phone to remain in its normal position. Also notice that channel 325 may very easily be placed on the left or right side of the phone so that the battery pack (not shown) on the back of phone 320 does not need to be moved to accommodate channel 325. Tabs and slots (not shown) within channel 325 and extension 324 would be used to provide click-in-place action for both the extended and retracted positions shown, and also prevent extension 324 from leaving channel 325.

In FIG. 6 we see a cellular phone design with a pivoting arm 332 with earpiece 334 on its end. Phone 330 may be a standard prior art phone design, but may be slightly shorter since no built-in speaker is needed. Instead, pivot arm 332 has speaker wires running through it to earpiece 334 with a speaker in it for listening. Arm 332 pivots around pivot joint 336 in the backward direction with respect to phone 330. Positions 332a and 334a show the positions of pivot arm 332 and earpiece 334 respectfully in their retracted position. Intermediate positions are also possible as shown by arm position 332b. Such angled arm positions allow the phone body to be angled away from the user and thus further reduce radiation levels to the user. Holding clip 338 can be an "L" shaped clip that allows pivot arm 332 to snap in place between the end of clip 338 and the side housing of phone 330 to stow it. Pivot joint 336 can also click into place in its extended position so the user can listen without earpiece 334 pivoting away from them. This layout with arm 332 pivoting below phone 330 may also use a passive sound channel to direct sound to earpiece 334 instead of using a speaker built-into the earpiece. To provide passive sound to earpiece 334, a speaker would be mounted inside the housing of phone 330 with a channel directing the sound to pivot joint 336. Sound generated would pass through channels in joint 336 and arm 332, and finally to earpiece 334 for listening.

In FIG. 7 we see a wireless communications device similar to phone 330 in FIG. 6, but with the pivot axis facing front to back (allows pivot arm to pivot to the side of phone 340). This allows phone 340 to use earpiece 344 in its retracted position (as shown) and its extended position 344a since the earpiece faces in the same direction in both positions. This dual position operation allow the phone to be used by the operator in both the extended and retracted positions. The designs in FIGS. 7, 8, 9, 10, 11, 12 and 13 allow operation in both the extended and retracted position, and in the case of FIGS. 8, 9, 12 and 13, the designs may also be operated at many intermediate positions. FIGS. 8 and 12, as well as others, may incorporate active feedback devices to cancel feedback in their retracted position because of their close proximity to the microphone. Designs shown in FIGS. 5, 6 and 14 may similarly be adapted to allow operation in the extended, retracted and intermediate positions. Because arm 342 pivots to the side instead of backward like phone 330 in FIG. 6 shows, earpiece 334 cannot pivot away when pressed against ones ear to talk. This design would most likely use an electrically driven speaker (not shown) within earpiece 344 to provide sound for the user, but the sound channels may also be used with this type of design. The wires leading to the speaker within earpiece 344 would pass through pivot axis 346 and through a channel within extension arm 342. When fully extended, tab 349 snaps into place in clip 347 to hold the arm and earpiece in positions 342a and 344a respectfully while being used. Additional locking positions may be added to arm 342. In position 342b, the arm is angled at 4 o'clock with respect to the body of the phone and its antenna at 12 o'clock. In the 4 o'clock position, the phone can be used inverted so the user holds the phone body and antenna pointing nearly straight ahead of themselves while talking. This further moves the antenna even further away from the user than position 342a and also places the user in the lowest radiation zone which can be directly behind the bottom of the antenna.

In FIG. 9 we see the inverted phone in FIG. 5 with a new front faceplate housing 370 and with display panel 374 and keypad 372 inverted with respect to the original display panel and keypad in FIG. 5. For example, faceplate 370 can be designed so that the openings for display 374 and the keys on keypad 372 can allow them to show through as shown. This change can allow the display panel 374 and keypad 372 to be used in their normal upright orientation when earpiece 322 is on top. Thus, the cellular phone in FIG. 9 can be a little easier to use. Notice that this particular phone design may be used with earpiece 322 extended or retracted. Microphone pickup 376 has also been moved downward on housing 370 to move it away from earpiece 322 when it is in its retracted position 322a. This reduces feedback of sound coming out of earpiece 322 which may be picked-up by microphone 376. The microphone may be moved further away from the centerline of the phone for even greater reduction in feedback from sound within channel 325. Speaker 326 may also be moved upward near earpiece position 322a to provide a shorter distance between the speaker 326 and earpiece 322.

In FIG. 10 we see the inverted phone 340 from FIG. 7 with a new housing faceplate 380. This new housing allows display 384 and keypad 382 to be oriented so that they both read upright in their normal operating direction (earpiece 344a extended at the top). Microphone 343 has remained in its original location so that it is far away from the sound output from earpiece 344 in both its retracted (344) and extended (344a) positions.

FIG. 11 shows phone 400 with a sliding earpiece extension 404 on the top, and a built-in transmitting antenna 416 on the bottom. This design is basically the same as the phone shown in FIG. 9 with a hidden (built-in) antenna and a spring-loaded earpiece extension 404. Faceplate 410 can be designed to show display 406 and keypad 412 in their upright orientation. Microphone 418 can be used to pick up the user's voice for transmission and may be located on the bottom as shown or anywhere not too close to sound output 402a or other sound source to cause feedback. Active feedback control circuits can also be used to reduce feedback. Generally a distance of two inches between speaker output and microphone is sufficient to eliminate feedback without any active feedback controls (sound cancellation circuit), especially if earpiece 402 seals well within the user's outer ear canal. As with the other designs in this document, an electronic feedback control circuit can be added to the phone to allow the earpiece output to be placed in close proximity to the microphone. Faceplate 410 can have an indentation pocket 417 designed to receive earpiece 402 when in its retracted position 402a. This pocket keeps the earpiece from getting caught on things and can allow the phone to easily slip in and out of a person's pocket.

Like other extendible arms in this document, extension arm 404 may be made rigid, but can also resilient enough to be substantially bent without breaking. Extendible arm 404 should be made with sufficient rigidity to substantially maintain its shape under its own weight. Arm 404 may also be designed to cushion movement of the phone during use, so that the user's hand holding the phone may be moved without creating excessive pressure against their ear with earpiece 402. This balance between flexibility and stiffness provides a comfortable listening device. Earpiece 402 can be made of a soft rubber or foam rubber like material to add additional comfort. Extension arm 404 has an air channel 405 that leads from earpiece 402 to end stop 407. Stop 407 can be designed to stop sound coming from speaker 419 from conducting down channel 414 and possibly causing feedback to microphone 418. This feedback problem may be solved by simply moving the microphone to the sides of the phone so it is away from guide channel 414, or simply placing an air pocket between channel 414 and microphone 418 to attenuate sound, or by employing active feedback cancellation electronically. Channel 414 can be sized to hold extension arm 404 when in its retracted position and form a relatively airtight seal in the extended positions. In this embodiment, extension arm 404 is designed to provide an air gap around arm 404 in its retracted position. This allows sound from speaker 419 escape from housing 410 when arm 404 is retracted and be heard by the user. Speaker 419 may alternatively be placed within earpiece 402 at location 419z to eliminate feedback and accomplish the same thing, that is, allowing the phone in FIG. 11 to be used in both its extended and retracted positions. The use of a spring-loaded arm on top with operation in both the extended and the retracted positions can easily be incorporated into the other embodiments, including those shown in this document.

Transmitting Antenna 416 in FIG. 11 is designed to be directional, where the maximum transmitted signal gain is directed way from the user (roughly into the page and/or out the bottom of phone 400 and/or out the side ends of antenna 416 (left and right on page)). Often an antenna will have several lobs of high signal gain, these types of antennas can also work if the high gain lobs can be directed away from the user's head during use. In this way, the lowest signal strengths can be directed toward the user's head and body. As higher frequencies are used for telecommunication, directional transmitting antennas will be able to provide better directing (or focusing) of electromagnetic radiation away from the user. At present the lower frequencies make it difficult to provide a transmitted signal gain greater than 10 dB (decibels) in a cellular phone sized package. An antenna with a ten decibel transmitting gain would provide a signal strength in the direction of its maximum about ten times the intensity of the signal strength in the direction of its minimum.

In FIG. 11, extension arm 404 can be biased by spring 415 so the user may extend the earpiece by pushing release button 411. Catch tab 401 can be designed to lock arm 404 in its retracted position (earpiece 402 at location 402a) by catching on lock pin 403. Release button 411 can be attached to pin 403 by rocker arm 409 which can be designed to cause pin 403 to release catch 401 when button 411 is depressed. Spring 415 biases extension arm 404 so that it extends when catch 401 is released. When fully extended, a stop (not shown), stops further extension of the arm so that it remains in the position shown in FIG. 11. This spring-loaded arm design can easily be adapted to the phone designs shown in FIGS. 5, 8, 9, and 13, and phone cover designs in FIGS. 1, 2, 8, 12 and 13. For example, in FIG. 8, a compression spring could be placed within air channel 362 and extend between the top inside of phone shroud 358 near air channel 361 to the top of extension arm 366. When the earpiece is retracted to position 368a the spring can be compressed into the area near channel 361 and a simple user-release latching system, similar to that seen in FIG. 11, could be used to lock arm 366 in place until the user activated it. Spring-loaded designs like these, may also be designed to activate the "on/off" switch and/or the "answer call" functions of the phone when the spring-loaded arm (i.e. 332, 366, 324, 342, 404, 424, 575) is released. Similarly, turning "on" the phone and/or "answering" the phone can be designed to automatically cause the extension arm (i.e. 332, 366, 324, 342, 404, 424, 575) to extend. Since the design in FIG. 11 can be used in both its retracted and extended position (also see FIGS. 6, 7, 9, 10 and 13) it may be desirable to provide a means to turn the phone "on" while the phone remains in its retracted position. However, for most situations, extending the earpiece automatically would be best.

FIG. 11A shows a side view of extension arm 404. Air sound channel 405 leads up through extension arm 404 and earpiece 402 to allow sound through for the user to hear. Earpiece 402 can be designed to fit snugly into the outer ear canal of a user, and may be designed to include removable earpiece covers to allow sizing the earpiece for different user's ears. Notice that earpiece 402 can be angled upward instead of at 90 degrees. This modification allows the earpiece to fit properly in the user's ear while allowing extension arm 404 and housing 410 to angle away from the user's face when being used. In general, the small earpieces shown on the designs in this Application can be substantially pivotal within the outer ear canal of the user. Thus, the addition of an angled earpiece adds comfort for the user. Larger earpieces that rest on the outer portion of the ear may also be used, but we prefer the use of ear-bud type earpieces which rest within the outer ear canal and are normally designed to be slightly larger than one-half inch in diameter for most users.

FIG. 13 shows an alternative cellular phone 470 where the sliding earpiece extension can be mounted on a flip-phone style cellular phone. Phone 470 has an upper housing 480 and a lower housing 484. Microphone 486 placed near the center of lower housing 484 which places it relatively nearer to the user's mouth for sound pickup. Spring tensioned hinge 482 can provide upper housing 480 two stable states: 1) opened, and 2) closed. The open condition is shown in FIG. 13, where upper and lower housing form an obtuse angle 489 at hinge 482. This angle can be less than 180 degrees so that the lower housing (and transmitting antenna 472) angles away from the user when earpiece 478 is placed flat against the user's ear. Other angles are possible including those where the lower housing 484 angles toward the user's mouth, however, this is less desirable since it can increase the electromagnetic radiation absorbed by the user's chin and neck. In the closed condition, upper housing 480 can be pivoted against the front face of lower housing 484 covering display 485 and keypad 488. Thus, phone 470 can be folded onto itself to form a compact package for storage. Spring tension within hinge 482 holds upper and lower housings 480 and 484 in this closed position. Upper housing 480 has been modified to include a sliding extension arm 475, which may be moved manually from a retracted to an extended position as shown by range of motion 477 or may be spring-loaded to allow automatic extension. This allows earpiece 478 to be moved from a retracted position 478a to the extended position as shown. Extension arm 475 slides within channel 481 which supports it in both its retracted and extended positions. Speaker 476 can be located near the hinge portion of the upper housing and transmits sound into channel 481. The placement of the speaker may be very close to the earpiece and may actually be mounted within arm 475. As with the other designs in this document, the speaker may be placed in a number of place with an air channel leading to the earpiece. For this design, channels 481 and 473 are connected to form a continuous air channel at all sliding positions of extension arm 475. Channel 473 in arm 475 can be open at the bottom to form a continuous and substantially sealed channel with channel 481 from speaker 476 to sound outlet 478. The channels can be further designed to allow sound from the speaker to be efficiently conducted to sound outlet earpiece 478. Thus, this allows the user to hear sound from speaker 476 at sound outlet 478. Battery pack 474 can be placed on the top half of upper housing 480 to allow room for speaker 476 near the bottom. If desired, speaker 476 may easily be mounted directly behind earpiece 478 to provide sound for the user, with wires to the speaker running up channels 481 and 473.

FIGS. 14A and 14B show presently preferred design for a personal wireless communication device. Flip phone 150 has two main sections, an upper housing portion 160 and a lower housing portion 164. Upper housing 160 comprises an elongated body with a sound outlet earpiece 158 molded into the housing and having openings to allow sound to exit from speaker 156 mounted behind the earpiece. For this design, battery 154 is mounted on the upper housing, but can just as easily be mounted to the lower housing. Upper housing 160 can also be designed for the user to easily hold. This allows the user to keep their hand and fingers away from antenna 152 while holding the phone naturally. Lower housing 164, in contrast, can be designed to not be easily gripped to encourage the user hold onto the upper housing and keep their hand away from antenna 152, and thus lowering electromagnetic radiation absorbed and also possibly improving signal transmission. Nearly any combination of components may be placed in lower housing 164 or upper housing 160, depending on design needs. For example, the controls for the phone, including keypad 165 may be placed in the upper housing or the lower housing. Similarly, display 163 and/or battery 154 may be mounted in the upper housing or the lower housing. Microphone 166 can be mounted in the lower housing near the bottom to place it somewhat in front and to the side of the user's mouth when speaking. In alternative embodiments, microphone 166 can be located at other locations on the lower housing or on the upper housing. In the specific embodiment in FIGS. 14A and 14B, transmitting antenna 152 is mounted below the bottom portion of lower housing 164. This is done to keep the transmitting antenna as far away from sound outlet 158 as possible while being used. Mounting the antenna on the bottom maximizes the distance between the user's ear and the transmitting antenna. In alternative embodiments, the antenna can be placed elsewhere on lower housing 164 and may include a pivoting antenna that can swivel. Upper housing 160 and lower housing 164 can be connected near the middle, for example, by hinge attachment 162. Spring tension within hinge 162 can give it at least two stable positions: 1) an extended (open) position (shown in FIGS. 14A and 14B), and 2) a retracted (closed) position where upper housing 160 closes against lower housing 164. In the closed position keypad 165, display 163, and/or microphone 166 can be covered by the upper housing. Upper housing 160 rotates along the path shown by pivot path 167, and can have more than 180 degrees of arc between the retracted and extended positions. Preferably, angle 167 is approximately 180 to 240 degrees. As shown in FIGS. 14A–B, when open (extended), phone 150 can form an obtuse angle 169 between the upper and lower housing so that the lower housing angles away from the user's face when earpiece 158 is placed flat against the user's ear. This results in the transmitting antenna being a significantly greater distance from the user's head and face than if the phone did not open passed the straight line position (180 degrees from closed position). This obtuse angling of the phone body is useful for other phone designs and can be angled anywhere between the earpiece and the bottom mounted antenna. Earpiece 402 in FIGS. 11 and 11A show one extreme, where the angled portion is right at the earpiece, while other designs demonstrate the other extreme where only the antenna is angled at the very bottom of the phone. The obtuse angling of the phone may be designed anywhere in-between these two extremes.

Operational Description

The inverting phone designs shown can be made to attach onto existing phones (FIGS. 1 through 4, 8 and 12), or built directly into the phone itself (FIGS. 5, 6, 7, 9, 10, 11, 13 and 14). None of the designs shown here require a significantly change in the way the user operates their communication device other than extending the earpiece and/or turning the phone upside-down to talk. For phone covers (FIGS. 1 through 4 and 8), and phone faceplates (FIG. 12), inverting the communications device while talking moves the antenna away from the user's head and brain and thus can greatly reduce the intensity of electromagnetic radiation received by the user (see FIG. 1B). All the designs can achieve this radiation reduction by moving the audio output (speaker sound) away from the antenna and away from the phone housing. For a passive attachment cover, the position of the audio output may be moved using sound tubes (or conduits) which channel the sound produced by the phone's speaker to an earpiece. For actively controlled designs, the phone's speaker can be simply moved to provide sound at the new location. By moving the audio output below the phone, these phones may be turned upside-down to be used. When inverted, these new phone designs have their audio output above the microphone on the phone. This allows the audio output and microphone positions to match the user's ear and mouth positions respectfully.

Inverting Attachment Covers—FIGS. 1–4, 8 and 12

In FIG. 1, we see the preferred embodiment inverting cover 220. The inverting cover can be strapped on to phone 30 by elastic bands 251 and 252 which holds the assembly together. To use the phone the user would dial a number on key pad 36 while viewing display screen 34 phone 30 in its upright position. Before or after dialing the number, the user would pull extension arm 238 out from channel body 248 to the extended position shown in FIG. 1. Then the user would invert the phone so that extension tube 238 was at the top, and place earpiece 236 next to their ear as shown in FIG. 1B. In this position the user may communicate normally, because microphone 38 can be positioned near the user's mouth in this arrangement. In fact, sound pickup may actually be better than with the phone in its standard upright position. Sound coming from speaker 39 can be channeled from chamber 243, to air passageway 246, through air passageway 238, and finally to earpiece 236 for the user to listen to. Thus, the user can hear and speak into the inverted phone naturally. When the user is done talking, extension tube 234 may be pushed back into channel 246 for storage. FIG. 1B shows a person using the assembly in FIG. 1 with extension tube 234 in its extended position.

In FIG. 2, we see an inverting cover on phone 30 which is similar in function to the inverting cover in FIG. 1, but with the sound conducting tubes running down the back side of the phone. To install the inverting cover in FIG. 2, one would slide speaker cover 260 down over the top of phone 30, with antenna 32 sliding through hole 264. The top of the phone can be pressed between speaker cover 260 and channel body 267 to snugly fit speaker chamber 261 over speaker 39. The bottom portion of channel body 267 can be snapped into place on the phone with a pair of holding clips 266. Once installed, this inverting cover can be operated the same way as the design in FIG. 1; one simply pulls out extension arm 270 as shown in FIG. 2, dials a number, and then inverts the phone to talk and listen. When finished, arm 270 can be simply pushed back into body channel 267.

In FIG. 3, we see a two piece inverting cover, with one piece inverting the speaker output and the other piece inverting the microphone input. In this way, sound can be routed to the correct location when the user talks and listens with the phone inverted. To operate, the user would dial a number and then invert the phone assembly to talk and listen. Sound from speaker 39 would be channeled to earpiece 286, and speech from the user would be picked up by sound inlets 296 and channeled to microphone 38. When finished, the user would simply turn the phone off, with nothing else to do since the phone assembly is already in its most compact state.

In FIG. 4, we see the two-cover design like the one in FIG. 3, but with the two channels connected to form a single unit. The cover would be installed on phone 30 by sliding it on the phone from the right side. The phone would be pressed between channel bodies 302 and 312 on the back, and covers 300, 314, 304, and 310 on the front. Channels 302 and 312 can be separated by supports tabs 306 to provide an air space to reduce cross-talk between the speaker and microphone sound channels. The phone would be operated the same as in FIG. 3.

In FIG. 8, we see a custom designed inverting cover, which has been shaped to fit sleekly over phone 30. To mount cover 350 on phone 30, the cover is slipped down over the top of phone 30 with antenna 32 fitting through hold 354. The precisely matched size of shroud 358 forms a tight, but removable fit. The cover and phone then work as if they were one. To operate the assembly, the user would simply dial the number they want to call, invert the phone, and pull out slide arm 366. By placing earpiece 368 in their ear, the user may talk normally with microphone 38 picking up their voice. When finished, the slide arm can simply be pushed back into channel 362 for storage.

In FIG. 12, we see phone faceplate 420 designed for replacement of the faceplate from prior art phone 30. In operation, the user would invert the phone and extend arm 424 to the position shown in FIG. 12, placing earpiece 422 in the outer portion of the user's ear canal for listening. Placement of the earpiece in the user's ear canal helps block out exterior noise, which improves the listening ability of the phone in noisy environments. Sound from speaker 39 can be channeled through channels 436, 438, 440, and 442, and finally out earpiece 422 for the user to hear. In the inverted position with earpiece 422 in the user's ear, microphone 38 can be located near the user's mouth for easy sound pickup of the user's voice. When the user is done speaking they simply push earpiece 422 back to position 422a with arm 424 sliding up into channel 440. If automatic extension of arm 424 is desired, a biasing spring may be used within channel 440 to provide the force needed to extend arm 424 (see example in FIG. 11). A button released latching mechanism would be used so the user could press a button to release arm 424 under spring bias to the extended position shown in FIG. 12. After use the user would simply push arm 424 back into channel 440 compressing the spring and latching the arm in its retracted position for its next use.

Built-in Speaker Extension—FIGS. 5, 6, 7, 9, 10, 11, 13 and 14

For the built-in designs in FIGS. 5, 6, and 7, only the speakers' output needs to be moved from their standard location. This greatly simplifies the design changes needed for the electronics within the phone, since only the location of the speaker sound output would need changing. The circuit board and antenna electronics may all remain in their present location within the housing with no changes needed to the circuit board or antenna. Speaker wires would simply be routed from the normal location on the circuit board through the existing air channels to the new output speaker in the earpiece for the user to listen. Thus, these modifications amount to nothing more than a redesign of the phone housing and connecting a new speaker in a different location. If the extendible arm is used in a passive mode, the speaker may be mounted nearly anywhere within the phone as long as a sound channel leads to the earpiece (see FIG. 5). For the built-in designs in FIGS. 9 and 10, more extensive changes may be needed to the electronics since the display and keypad are inverted with respect to the antenna. This requires the repositioning of the electronics within the phones to provide the desired layout. Below we will discuss the operation of these phones with a built-in speaker inverter.

In FIG. 5, we see sound channel 325 built into cellular phone 320 with the basic location of its electronic components in the same layout as a standard cellular phone. Speaker 326, however, can be completely enclosed within the phone's housing so that all the sound is channeled down to the channel within sliding arm 324 and out to earpiece 322. To operate the phone the user would dial normally and then invert the phone and extend sliding arm 324 as shown. The user would then put earpiece 322 against their ear to talk and listen. When finished the sliding arm may be pushed back up into channel 325 for storage.

In FIG. 6, we see another inverting phone, where arm 332 rotates to an extended position for use. With arm 332 extended as shown, the user would dial a phone number and then simply invert the phone placing earpiece 334 against their ear to talk. When done arm 332 would simply be rotated back up into its stowed position 332a. Phone 330 may also be operated with arm 332 in other positions. With the arm in position 332b the phone body and antenna would angle slightly away to the side of the user when the arm is placed flat against the user's face. This would be true whether the phone was used on either of the user's ears. This slight angle moves the antenna even further away from the user's body.

In FIG. 7, phone 340 would be used nearly the same as phone 330 in FIG. 6 except that arm 342 would rotate to the side when extending. For this particular design, phone 340 can be used with arm 342 in both the extended and the retracted positions. This is because of the way arm 342 rotates. In the retracted position as shown in FIG. 7, the phone may be used just like a standard phone by dialing and then placing earpiece 344 against the one's ear. When arm 342 is extended to position 342a, the earpiece at 344a still faces forward so the user may operate the phone by dialing, inverting and then placing earpiece 344a in their ear to talk. Thus, this design may operate in a normal upright position and also an inverted position. If pivot arm 342 in FIG. 7 was extended to position 342b, this would place the arm at approximately five o'clock (6 o'clock fully extended) with respect to the phone body and antenna. When the user now puts earpiece 344 next to their ear, the phone body and antenna would angle nearly directly forward and away from the user's body. With arm 342 at a right angle (3 o'clock) position, the phone would actually be angled up slightly since the normal holding position for a phone can be at a slight angle. Thus, by allowing the user to pivot the extension arm to different positions, the user can adjust the phone to meet their particular way of holding it. Also, electromagnetic radiation shielding may be used with all these designs to further reduce radiation absorbed by the user's body. Below are a few more illustrations of ways the invention may be varied.

In FIG. 9, we see a phone design that uses a bottom mounted antenna with a top mounted earpiece extension. During use, the user would type in the phone number on keypad 372 as with any other phone design. Before or after dialing the phone number on keypad 372 the user would extend the speaker output earpiece 322 from position 322a to the position shown. The user would then place earpiece 322 near their ear and talk normally, with microphone 376 picking up their voice. When finished the user would push earpiece 322 back into housing to the retracted position 322a and extension tub 324 would slide into channel 325 for storage. Earpiece 322 may be stowed entirely within housing 370 with the addition of finger tabs (not shown) to allow gripping it for extension.

In FIG. 10, we see a phone design that uses a bottom mounted antenna with an earpiece that extends by rotating up above the phone housing. During use, the user would type in the phone number on keypad 382 as with any other phone design. Before or after dialing the phone number on keypad 382 the user would extend the speaker output earpiece 344 from the position shown to position 344a above phone housing 380 by pivoting extension arm 342 around pivot axis 346. The user would then place earpiece 344 (in position 344a) near their ear and talk normally, with microphone 343 picking up their voice. When finished the user would rotate earpiece 344 back to the bottom of housing 380 with clip 348 holding extension arm 342 in place as shown.

In FIG. 11, we see phone 400 with an extendible arm 404. Phone 400 can be stored with extension arm 404 in its retracted and locked position with the earpiece at position 402a, held in place by the release mechanism. In this state, catch tab 401 can be held in place by lock pin 403, with spring 415 compressed in guide channel 414, by sound stop 407 on the extension arm. To use the phone, the operator may use a single hand hold the phone and press button 411, which rotates arm 409 and pulls lock pin away from tab 401. When this happens, arm 404 is released, and spring tension supplied by spring 415 forces the arm quickly up to its extended position as shown in FIG. 11. At the same time, movement of arm 404 and/or the movement of the release mechanism may be used to activate the phone, either to turn it on and/or to answer a call. Once the phone is on, the user may dial a number or answer a call by activating keypad 412 at any time during this procedure. Ear-bud style earpiece 402 may then be placed in the user's outer ear canal to listen and their voice picked up by microphone 418. Because of the angled end on the earpiece, the user has more freedom to angle the phone further away from their face, thus further reducing the radiation intensity to their face. Though most of the embodiments disclose here show small ear-bud type earpieces, these designs may also be modified to use larger flat-face style earpieces, such as sound outlet 478 in FIG. 13. Also, these larger flat-face earpieces may be angled like earpiece 402 to provide the angling away of the phone housing and antenna when the flat-face surface of such an earpiece is placed flush against the user's ear.

For the design in FIG. 13, the operation is essentially the same as other standard flip-phones except for the added audio output extension. Earpiece extension 475, on flip phone 470, may be slid out to further extend the sound outlet (earpiece) 478 and thereby moving transmitting antenna 472 further away from the user during operation. To extend earpiece extension 475 the user simply grips sound outlet section 478 between their thumb and forefinger and pulls upward out of channel 481 until it locks into its extended position as shown in FIG. 13. If a spring-loaded design is used, the user would simply release extension arm 475 and it would extend up to the position shown in FIG. 13. During operation, the sound output from speaker 476 travels up channel 481 and then through channel 473 to reach sound outlet 478 for the user to hear. Notice that the speaker sound will exit sound outlet 478 independent of whether extension 475 is extended or retracted (sound outlet 478 as shown or in position 478a). This is because channels 481 and 473 slide within one another to form a continuous air channel between the speaker and the earpiece. This allows the user to place earpiece 478 anywhere within its range of motion 477 to talk. Thus, this design gives the user the option of talking on the phone with the earpiece extended or retracted depending on preference. When the user is done they simply push extension 475 back into channel 481 for storage.

In FIGS. 14A and 14B, the operation of phone 150 can be identical to the operation of a standard flip phone, and discussed here for clarity. Upper housing 160 is normally stored in the closed position with upper housing 160 and lower housing 164 folded together (upper housing folded down to cover keypad 165 on lower housing 164). To operate, upper housing 160 is lifted off of lower housing 164 and rotated through angle 167 to the position seen in FIGS. 14A and 14B. Spring tension within hinge 162 holds upper housing 160 in this backward angled position while in use. Phone may also have a stable position in a substantially in-line (straight configuration) as well as other useful angles depending on the user's needs. Once keypad 165 is exposed, the user then dials a phone number and rests sound outlet 158 against their ear to listen and talk. The backward angle 169 between the upper and lower housing causes transmitting antenna 152 to angle away from the user's face. Thus, radiation exposure can be provided by the extra distance between the user and the transmitting. Radiation exposure can also be reduced by positioning the transmitting antenna so that the user's head is substantially placed within the minimum portion the antenna's radiation pattern (lowest radiation direction is often directly behind the maximum output direction for the antenna. For the specific embodiment of phone 150 this would mean the lowest radiation levels would be longitudinally along antenna 152 and lower housing 164). Upper housing 160 can be designed to have the majority of the volume of the phone so that the user can easily grip upper housing 160 to talk. With the user griping mainly the upper housing, the user's hand and fingers are kept away from the lower housing and transmitting antenna 152. This reduces the radiation levels experienced by their hand as well as their head. In an additional embodiment, a majority of the mass of phone 150 can be placed in the upper portion of the phone will help make the phone feel more balanced when gripped.

Ramifications, and Scope

Although the above description of the invention contains many specifications, these should not be viewed as limiting the scope of the invention. Instead, the above description should be considered illustrations of some of the presently preferred embodiments of this invention. For example, in sliding extension designs, there are many ways to extend and retract the earpiece away from a communications device. A rotating joint or other pivoting device would work just as well as a sliding one. For longer extension arms a multi-segment telescoping arm could even be used, as could, other adjustments to the extension arm design. For example, a rotating joint on the earpiece could be used to adjust the earpiece's position for both user comfort and positioning the earpiece for storage. Likewise, the placement of attachment points and the means of attaching the inverting covers to the phone is non-critical to the operation of the invention as long as the inverting cover is secure enough to not fall off during use and forms a sufficiently good seal around the speaker (for sound conducting versions) and channels for operation. The path that sound pipes or speaker wires take as they transmit audio signals to the output earpiece may also be varied without significantly changing the functionality of the inverting cover. For example, having some sound pipes along the rear of the cellular phone and some along the side is perfectly acceptable, as is having multiple sound pipes or channels. Also, the means of stopping the extension arms in FIGS. 1, 2, 5, 8, and 13 from sliding out of their channel may be accomplished in many standard ways including ringed edges or tabs. Similarly, many cosmetic changes may be made to the design, by changing the surface shape, color, or texture. Also, there is no reason the extension arm with the earpiece on it can not be angled in different directions to provide easier holding of the phone and/or to move the antenna further away from the user's body. Such a pivoting arm may also have many operational positions (see FIG. 7) that the user may select from. Also, electromagnetic radiation shielding may be used with all these designs to further reduce radiation absorbed by the user's body. Below are a few more illustrations of ways the invention may be varied.

In FIG. 5, cellular phone 320, can easily use electrical wires to drive a speaker in earpiece 322, and thus eliminate the need for the sound channel and speaker 326. Many of the other designs shown here can use wire driven speaker earpiece, such as, those seen in FIGS. 5–7, 9–11, and 13. The designs where the earpiece and/or speaker are placed close to the microphone may use a feedback cancellation circuits to reduce feedback through the sound system. Such feedback controlling systems have been well known in the area of speaker phones and answering machines, and are also used in speaker style cellular phones. This feedback control would be especially useful in designs such as those shown in FIGS. 5 and 9, where the microphone is near the earphone output when in the retracted configuration. By reducing feedback, these design can more easily be operated in their retracted positions, so the user may use the phone in both the extended and retracted positions.

In FIG. 8, if phone 30 had a curved shape (thicker in the middle than on the top or bottom), the shroud could still be easily designed to slip over the phone. By adding a deformable side (not shown) opposite sound conduit 360, the width of the shroud 358 may deform to slip over wider sections of the phone. This way the shape of shroud 358 and the orientation of sound conduit 360 can be curved and angled to match the design lines of the curved phone. One way to allow flexing of the side walls of shroud 358 is to use a flexible finger for the shroud's side opposite of conduit 360. The narrowing section of the flexible finger would be able to expand wider as it passed over the thicker regions of the phone and then snap back to fit tightly around the phone once completely in place. This way even a phone with curved sections can be covered with a shroud that follows its curves, giving the inverting cover an almost built-in look. The shroud may also be designed to flex in the front-to-back direction, as well as side-to-side.

Again in FIG. 8, notice that a pivoting joint, similar to joints 336 and 346 in FIGS. 6 and 7 respectfully, can easily be used with the shroud design on attachment cover 350. A hollow pivot joint may be mounted at the bottom of sound channel 362 to connect with arm channel 367. In this way an air passageway would exist from speaker 39 to earpiece 368 by going through the pivot joint. The arm would then simply rotate between retracted and extended positions instead of sliding. For the ultimate in flexibility, the extension arm may be simply made of a flexible tube that can hold its shape once bent into a shape. Many long-necked microphones have coiled metal shafts that can be bent and will hold their position, and many other ways of making a bendable extension arm that can be repeatedly bent. Such extension arms allow optimum positioning of the earpiece on any of these phone designs.

A spring-loaded extension arm like that seen in FIG. 11 may be used in many different phone and phone attachment designs. Besides being used in linear extension arm designs like those in FIGS. 1, 2, 5, 8, 9, 11, 12, and 13, spring-loading may also be used on pivotally extendible arms like those in FIGS. 6, 7 10 and 14. One advantage of the spring-loaded arm extension is that it can be extended for use by the user with a single hand. Also, the latching/release mechanism for these spring-loaded arms may be designed in a multitude of ways, including the use of dual release buttons and/or recessed buttons to reduce accidental release of the arm extension. An alternative to the spring-loaded arm can be a permanently extended arm that is resilient enough that it does not break easily. Such a permanently extended arm may be used on phones, phone shrouds, phone faceplates, and other phone designs to provide the added distance from the antenna.

Finally, the extendible audio outputs (earpieces) shown in this document may be used with any and all the phone designs and styles which exist in prior art. Only a small sample of the possible designs have been shown here. The audio extension works with fixed antenna cellular phones as well as the extending antenna designs, with top mounted antenna designs as well as bottom mounted designs. And protects the user whether the antenna protrudes from the housing or is molded within the housing and can be hidden. The fact that the earpiece moves the sound output position away from the transmitting antenna is what provides the reduction of radiation to the user's brain. The arm and earpiece can be statically mounted to the phone so that no extending or retracting is needed. The earpiece would simply be positioned on the end of an extended arm. For example, in FIG. 9, arm 324 can be molded directly into housing body 370. This "fixed" extended arm can be made of flexible material so that it would be unbreakable, and may even be designed to bend completely over against the side of the phone body for storage. Even with this flexibility, the extended arm can still have sufficient resilience to be held steady against the user's ear. Such a design may find it beneficial to remove the earpiece, so that there is nothing on the end of the extended arm to catch on things. An output hole on the side of the extended arm can be used instead of an earpiece. Sound would simply stream from the hole in the extended arm for listening. This output hole design may require higher volume sound to be projected from the output hole than is typical for ear-bud style designs, since the sound is not trapped within the ear canal. A small rounded bump may be added near the output hole so the user has a physical structure to help them keep the output hole near the entrance to the user's ear.

Thus, the scope of this invention should not be limited to the above examples, but should be determined from the following claims:

We claim:

1. An attachment cover for use with a personal wireless communication device having a speaker, a transmitting antenna, and a microphone, said attachment cover comprising:
   a) a sound conducting means comprising a first end, an elongated air channel and a second end;
   b) a shroud defined on said attachment cover for removable attachment to the personal wireless communication device wherein said shroud is integrated with said sound conducting means and designed to fit snugly over the speaker area of the personal wireless communication device for directing sound from the speaker substantially into said first end;
   c) wherein said sound conducting means is adapted for collecting a significant portion of the sound generated by the speaker of the personal wireless communication device at said first end and conducting the sound through said elongated air channel and out said second end, wherein a user may place their ears near said second end to listen to sound generated by the speaker of the personal wireless communication device;
   d) wherein said second end is positioned during use at a greater distance from said transmitting antenna than said speaker, whereby positioning the transmitting antenna significantly further from the user's head during use than without said attachment cover.

2. The attachment cover in claim 1, wherein said sound conducting means comprises an elongated air channel, wherein said first end is a speaker cover end for directing sound generated by the speaker of the personal wireless communication device into said elongated air channel and out said second end.

3. The attachment cover in claim 1, further comprising:
   an ear-bud style earpiece connected to said second end of the sound conducting means.

4. The attachment cover in claim 1, wherein said sound conducting means comprises an extendible arm, wherein said extendible are is movable to an extended position and a retracted position, wherein said second end when in said extended position is located substantially further away from the transmitting antenna than when in said retracted position.

5. The attachment cover in claim 4, wherein said second end when in said extended position is positioned further away from said transmitting antenna than when in said retracted position.

6. The attachment cover in claim 4, wherein said second end when in said extended position is positioned further away from said shroud than when in said retracted position.

7. The attachment cover in claim 4, wherein said personal wireless communication device and second end are usable by the user in both said extended and retracted positions.

8. The attachment cover in claim 4, wherein said extendable arm comprising a biasing mechanism and a release mechanism, wherein said biasing mechanism tends to extend said second end, wherein said release mechanism is designed to hold the extendable arm in the retracted position and release the extendable arm from the retracted position when activated.

9. The attachment cover in claim 8, wherein the user can release the extendable arm and extend the earpiece with one hand.

10. The attachment cover in claim 8, wherein said biasing mechanism comprises a biasing spring.

11. The attachment cover in claim 8, wherein said personal wireless communication device and said second end are usable by the user in both said extend and retracted positions.

12. The attachment cover in claim 11, wherein said second end is an ear-bud style earpiece.

13. The attachment cover in claim 8, wherein said attachment cover comprises a top end and a bottom end, wherein said bottom end is designed to be positioned substantially closer to said transmitting antenna than said top end, wherein during use said second end is extended substantially above said top end with said bottom end below said top end, whereby said second end and said transmitting antenna are positioned substantially at opposite ends of the attachment cover and personal wireless communication device combination.

14. The attachment cover in claim 13, wherein said extendable arm lowers the in use position of the bottom end with respect to the user.

15. The attachment cover in claim 1, wherein said shroud comprising a housing for enclosing the personal wireless communication device.

16. A faceplate cover for use with a personal wireless communication device having a speaker, a transmitting antenna, and a microphone, said faceplate cover comprising:
c) a faceplate portion designed for attachment to said personal wireless communication device;
b) a sound conducting means defined within the faceplate cover comprising a first end, a second end and an elongated air channel;
c) a connecting means defined on said faceplate portion for attaching said faceplate cover to the personal wireless communication device,
d) wherein when said faceplate cover is attached to said personal wireless communication device said first end is positioned in close proximity to said speaker, whereby a significant portion of the sound generated by the speaker is directed into said first end, through said elongated air channel and out said second end, whereby a user may place their ears near said second end to listen to sound generated by the speaker of the personal wireless communication device;
e) wherein said second end is positioned during use at a greater distance from said transmitting antenna than said speaker, whereby positioning the transmitting antenna significantly further from the user's head during use than without said faceplate cover.

17. The faceplate cover in claim 16, wherein said faceplate cover comprises a top end and a bottom end, wherein said bottom end is designed to be positioned substantially lower than said top end during use, and wherein said transmitting antenna is mounted closer to the bottom end than to the top end and said second end is closer to said top and that to the bottom end during use.

18. The faceplate cover in claim 16, wherein said elongated air channel lowers the in use position of the bottom end with respect to the user and wherein the personal wireless communication device is substantially inverted during use.

19. The faceplate cover in claim 16, wherein said sound conducting means comprising an extending means for extending the second end, wherein upon extension of said extending means the second end is extending to an extended position and upon retraction of the extending means the second end is retracted to a retracted position, wherein said second end when in said extended position is located substantially further away from the transmitting antenna than when in said retracted position.

20. The faceplate cover in claim 19, wherein said said second end is connected to said extending means at an angle, whereby during use the extending means and the personal wireless communication device are angled away from the user's face and head when said second end is positioned against the user's ear.

21. The faceplate cover in claim 19, wherein said extending means comprises an elongated channel attached to said connecting means and an extendible arm slidable within said elongated channel, wherein said extendible arm is slidable to said extended position and said retracted position.

22. The faceplate cover in claim 19, wherein said extending means comprising an elongated channel, a pivot joint, and an extendible arm, wherein said elongated channel is connected to said connecting means, wherein said pivot joint is connected to both said elongated channel and said extendible arm, wherein a substantially continuous air passageway is formed between the speaker and said second end.

23. The faceplate cover in claim 19, wherein said second end is usable for listening in both said extended position and said retracted position.

24. The faceplate cover in claim 19, further including;
a biasing spring for automatically extending said sound conducting means in response to activation of a latching means on said faceplate cover for holding and releasing said sound conducting means from its retracted position.

25. The faceplate cover in claim 19, wherein said faceplate cover comprises a top end and a bottom end, wherein said bottom end is designed to be mounted substantially closer to said transmitting antenna than said top end, wherein during use said second end is extended substantially above said top end with said bottom end below said top end, whereby said second end and said transmitting antenna are positioned substantially at opposite ends of the faceplace cover and personal wireless communication device combination.

26. The faceplate cover in claim 16, wherein said sound conducting means is movable to an extended position and a retracted position, wherein said earpiece when in said extended position is positioned further away from said transmitting antenna than when in said retracted position.

27. The faceplate cover in claim 26, wherein said personal wireless communication device is usable with said sound conducting means in both said extended position and said retracted position.

28. The faceplate cover in claim 16, further including an earpiece, wherein said earpiece is mounted on said second end.

* * * * *